United States Patent
Ito

(10) Patent No.: US 10,181,168 B2
(45) Date of Patent: Jan. 15, 2019

(54) PERSONAL SAFETY VERIFICATION SYSTEM AND SIMILARITY SEARCH METHOD FOR DATA ENCRYPTED FOR CONFIDENTIALITY

(71) Applicant: Hitachi Kokusai Electric Inc., Chiyoda-ku, Tokyo (JP)

(72) Inventor: Wataru Ito, Tokyo (JP)

(73) Assignee: HITACHI KOKUSA1 ELECTRIC, INC., Tokyo (JP)

( * ) Notice: Subject to any disclaimer, the term of this patent is extended or adjusted under 35 U.S.C. 154(b) by 218 days.

(21) Appl. No.: 15/127,243

(22) PCT Filed: Mar. 31, 2014

(86) PCT No.: PCT/JP2014/059443
§ 371 (c)(1),
(2) Date: Sep. 19, 2016

(87) PCT Pub. No.: WO2015/151155
PCT Pub. Date: Oct. 8, 2015

(65) Prior Publication Data
US 2017/0109852 A1    Apr. 20, 2017

(51) Int. Cl.
*G06Q 50/26* (2012.01)
*G06F 17/30* (2006.01)
(Continued)

(52) U.S. Cl.
CPC .......... *G06Q 50/265* (2013.01); *G06F 17/30* (2013.01); *G06F 21/32* (2013.01); *G06Q 50/00* (2013.01); *H04L 9/30* (2013.01); *H04L 63/0428* (2013.01)

(58) Field of Classification Search
None
See application file for complete search history.

(56) References Cited

U.S. PATENT DOCUMENTS 6,774,917 B1 * 8/2004 Foote ................ G06F 17/30814
707/E17.028
8,019,742 B1 * 9/2011 Baluja ............... G06F 17/30259
706/58
(Continued)

FOREIGN PATENT DOCUMENTS

JP    05-154651 A    6/1993
JP    09-198401 A    7/1997
(Continued)

OTHER PUBLICATIONS

International Search Report from International Application No. PCT/JP2014/059443 dated May 13, 2014.
(Continued)

*Primary Examiner* — Kaveh Abrishamkar
(74) *Attorney, Agent, or Firm* — Brundidge & Stanger, P.C.

(57) ABSTRACT

Disclosed is a system whereby it is possible to verify the safety of a person even if the person is not aware that the person is being searched for as a missing person. In this system, each verification requesting person who is searching for another person registers, in a database of a portal server (4), a set comprising a feature value of the face of the searched-for person and personal information (e.g., telephone number) about the searched-for person or the verification requesting person. A field server (2) constantly compares feature values of captured face images with the database, and if a close match is found between the feature value of a captured face image and the stored feature value of the face of a person, the field server (2) presents the registered personal information associated with that person to the person from which the captured face image was derived and requests verification from the latter person. Since the system is open to the public, the feature values stored in the database are protected by a template protection
(Continued)

scheme. For example, random projections which differ with different locality-sensitive hash values of feature values are used so that it can be assumed that, in the vicinity of a target feature value, a local distance-preserving mapping is established between feature values and the corresponding protected feature values.

9 Claims, 12 Drawing Sheets

(51) Int. Cl.
*G06F 21/32* (2013.01)
*G06Q 50/00* (2012.01)
*H04L 9/30* (2006.01)
*H04L 29/06* (2006.01)

(56) References Cited

U.S. PATENT DOCUMENTS

| | | | |
|---|---|---|---|
| 2005/0084154 A1* | 4/2005 | Li | G06K 9/4652 382/190 |
| 2009/0257589 A1 | 10/2009 | Yokota et al. | |
| 2013/0114811 A1 | 5/2013 | Boufounos et al. | |
| 2013/0290350 A1* | 10/2013 | Mueen | G06F 17/30979 707/749 |
| 2015/0254280 A1* | 9/2015 | Wang | G06F 17/3053 707/723 |
| 2017/0031931 A1* | 2/2017 | Linda | G06F 17/30241 |
| 2017/0109852 A1* | 4/2017 | Ito | G06F 17/30 |
| 2018/0101570 A1* | 4/2018 | Kumar | G06F 17/10 |

FOREIGN PATENT DOCUMENTS

| | | |
|---|---|---|
| JP | 2003-304300 A | 10/2003 |
| JP | 2005-301677 A | 10/2005 |
| JP | 2006-243798 A | 9/2006 |
| JP | 2006-254798 A | 9/2006 |
| JP | 2007-052698 A | 3/2007 |
| JP | 2009-027493 A | 2/2009 |
| JP | 2010-213230 A | 9/2010 |
| JP | 2011-022641 A | 2/2011 |
| JP | 2011022641 A | 2/2011 |
| JP | 2012-068717 A | 4/2012 |
| JP | 2012-085114 A | 4/2012 |
| JP | 5-125424 A | 1/2013 |
| JP | 2013-080365 A | 5/2013 |
| JP | 2013-218511 A | 10/2013 |
| WO | 2013/080365 A1 | 6/2013 |
| WO | 2013182101 A1 | 12/2013 |

OTHER PUBLICATIONS

Hiroshi Sukegawa and four others, "Development of a large-scale people search system using face recognition", Proceedings of Biometrics Workshop, the Institute of Electronics,Information and Communication Engineers,Aug. 27, 2012, p. 102-107, Internet <URL:http://www.ieice.org/~biox/2012/001-kenkyukai/pdf/BioX2012-18.pdf>.

Takayoshi Yamashita, "Efficient Features for Object Recognition", [online], Nov. 28, 2008, [searched on Feb. 21, 2014], Internet <URL: http://www.vision.cs.chubu.a c.jp/features/PPT/CVIM 2008 / ppt.pdf>, 110 Pages.

Yair Weiss, et al, "Spectral Hashing", [online], [searched on Feb. 21, 2014], Internet <URL:http://people.csail.mit.edu/torralba/publications/. 8 pages.

Anxiao Jiang, et al, "Rank Modulation for Flash Memories", [online], [searched on Feb. 21, 2014],Internet,<URL:http://www.paradise.caltech.edu/papers/etr086.pdf>, 9 pages.

Alexander Barg and Arya Mazumdar, "Codes in Permutations and Error Correction for Rank Modulation", [online], [searched on Feb. 21, 2014], 7 pages., Internet <URL:http://citeseerx.ist.psu.edu/viewdoc/download? doi=10.1.1.249.198&rep=rep1&type=pdf>, Aug. 27, 2009.

Hisashi Koga, "Hash-based Similar Search Techniques and Their Applications",Fundamentals Review, the Institute of Electronics, Information and Communication Engineers, Engineering Science Society, Jan. 1, 2014, vol. 7, No. 3, pp. 256-267, Internet<URL:https://www.jstage.jst.go.jp/article/essfr/7/3/7_256/_pdf>.

Tuyls Pim, et al, "Capacity and examples of template-protecting biometric authentication systems", ECCV Workshop BioAW, No. 77, 2004, Internet<http://eprint.iacr.org/2004/106.pdf>, 13 pages.

Singapore Supplementary Search Report, dated Nov. 27, 2017.

* cited by examiner

FIG.5
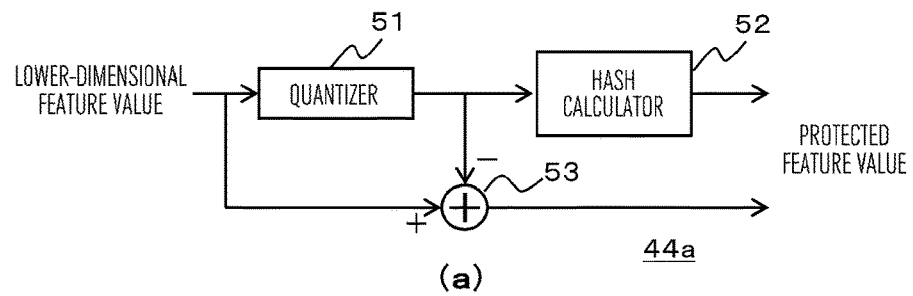
(a)
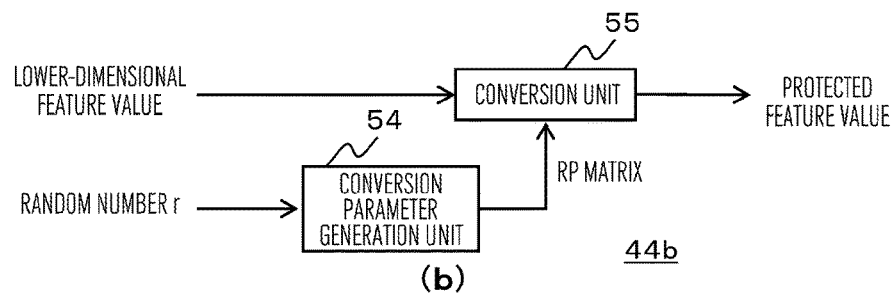
(b)
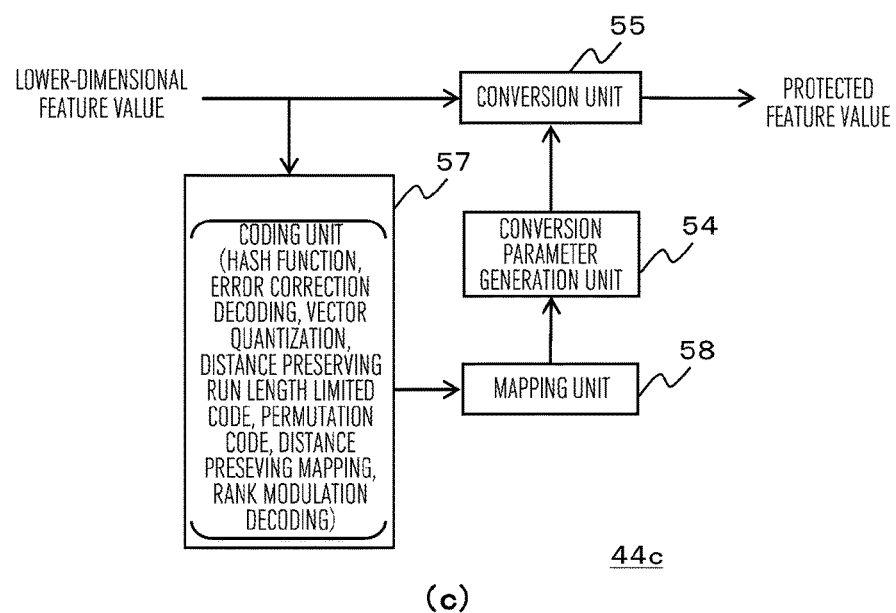
(c)
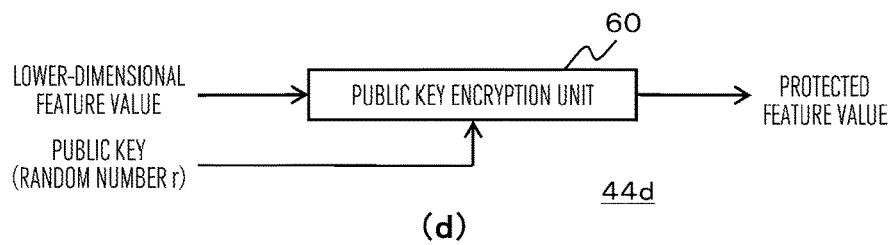
(d)

FIG.7
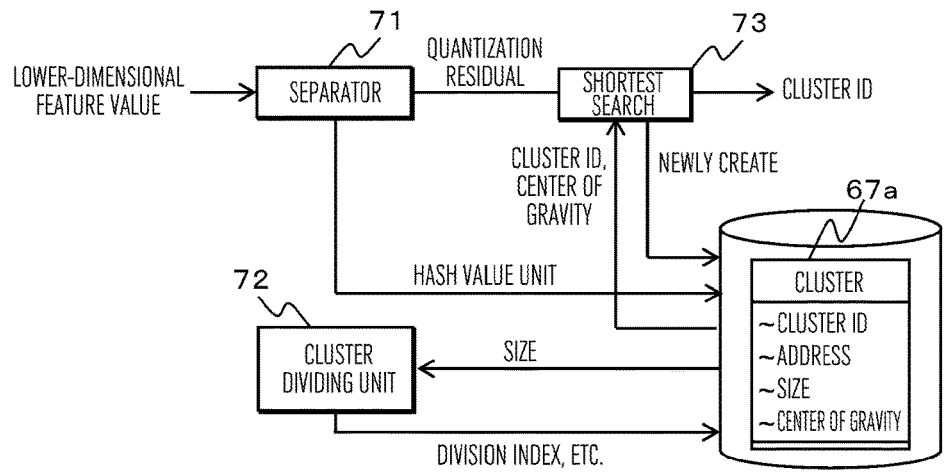
(a)
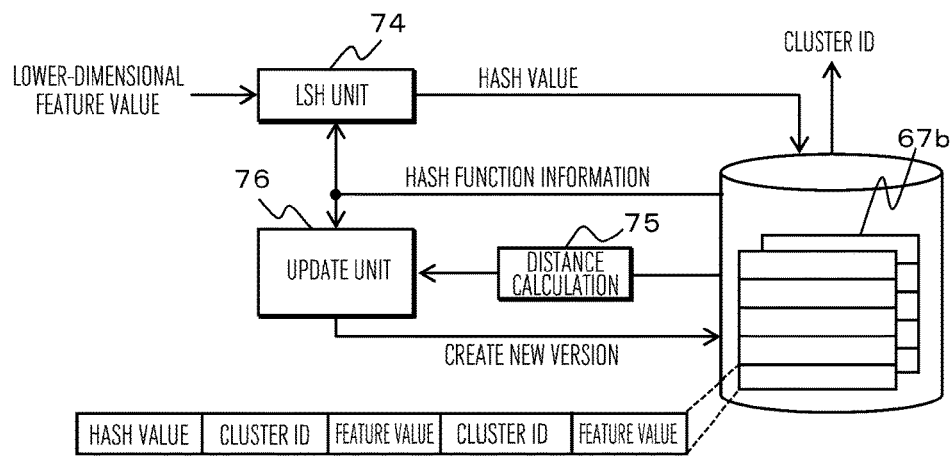
(b)
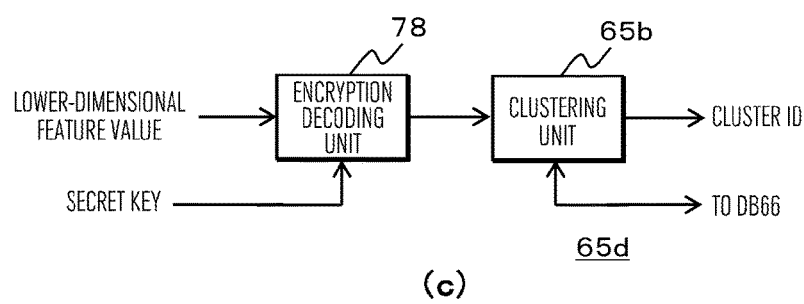
(c)

FIG.9
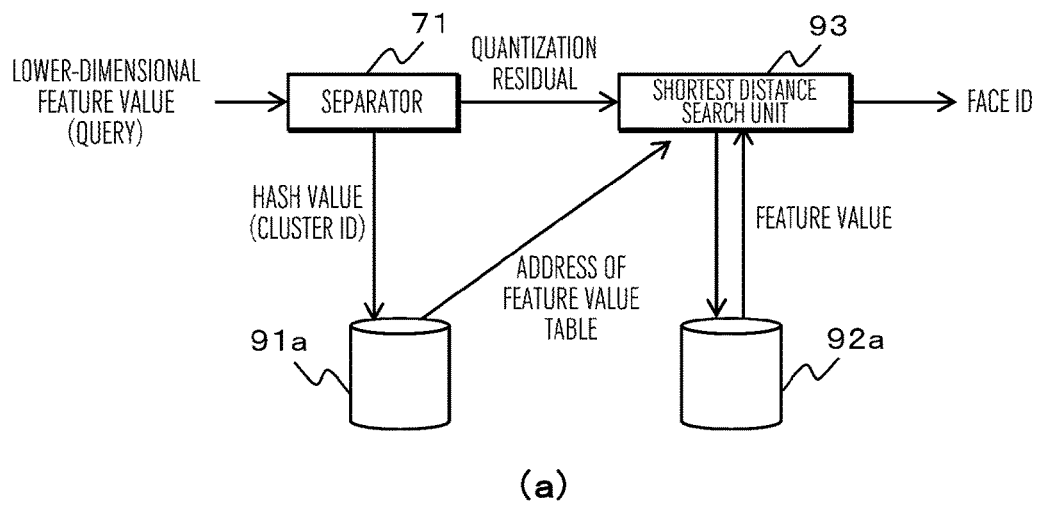
(a)
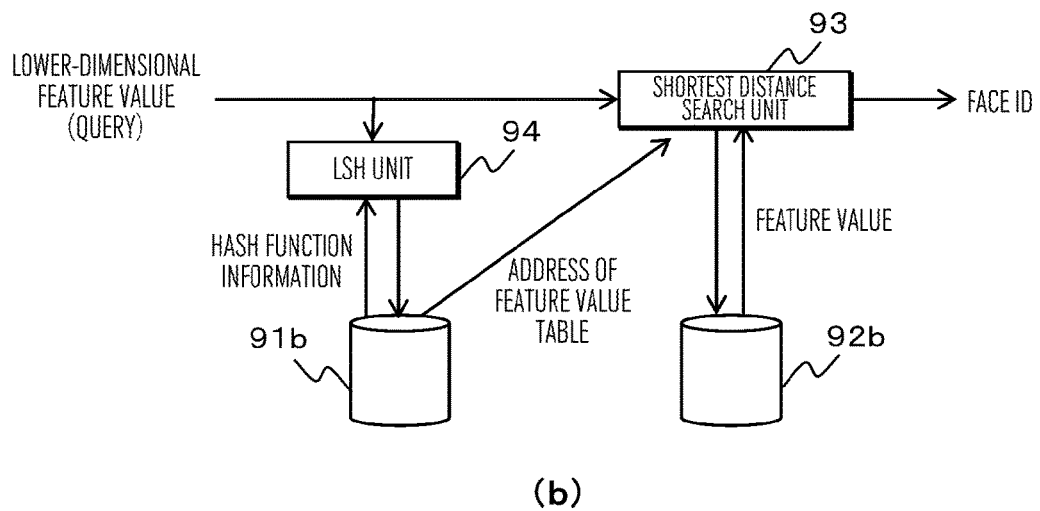
(b)

FIG.12
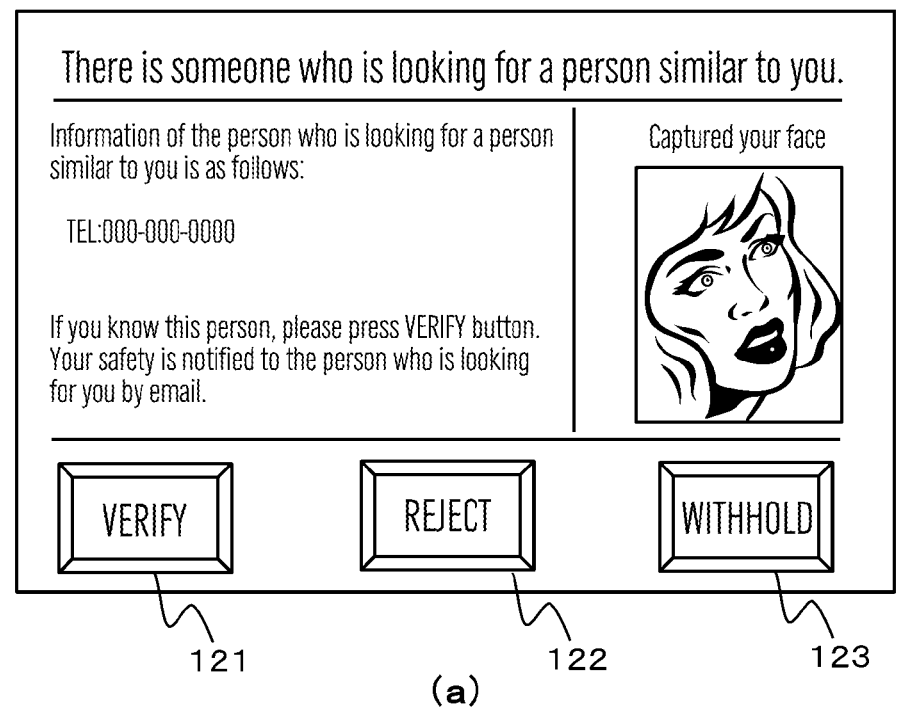
(a)
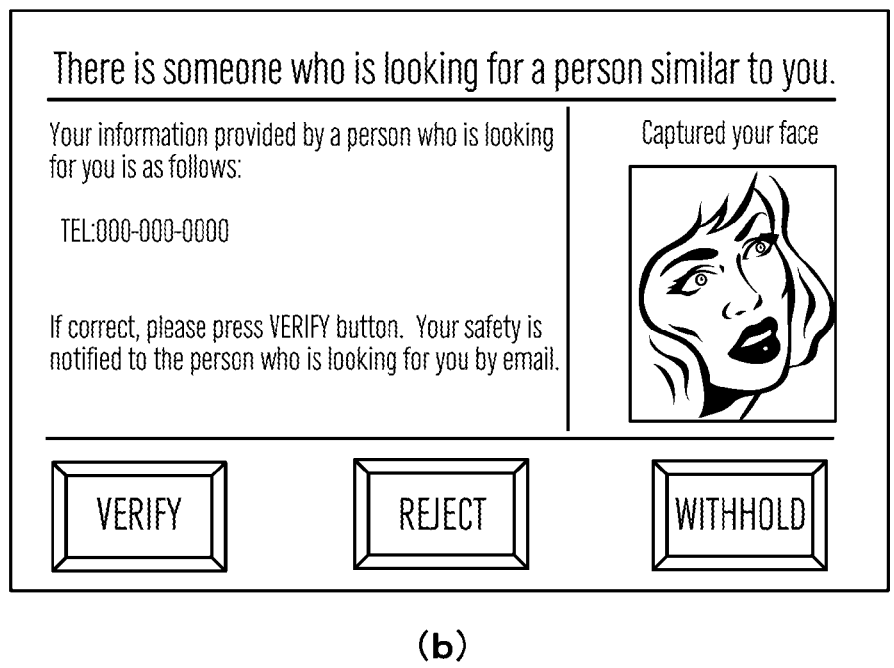
(b)

PERSONAL SAFETY VERIFICATION SYSTEM AND SIMILARITY SEARCH METHOD FOR DATA ENCRYPTED FOR CONFIDENTIALITY

TECHNICAL FIELD

The present invention relates to a similarity search method for data encrypted for confidentiality, for performing similarity search on biological feature information or the like which is encrypted for confidentiality or protected to a level that a person cannot be identified easily. The present invention also relates to a personal safety verification system to which the method is applied, and the like.

BACKGROUND ART

A person search system, which allows a computer to search for a target person from video images (moving images) captured or recorded by a surveillance camera or the like, using an image recognition technology or the like, has been known conventionally (for example, see Patent Literatures 1 to 4 and Non Patent Literature 1). Such a technology of performing searching based on features of an image itself, without depending on external information such as tagging, is generally called CBIR (Content-Based Image Retrieval) which has been started to be also used for searching for a person.

Patent Literature 2 discloses a video image search system and a person search method in which a portion where (the face of) a person is cut out from an image, and a color histogram or the like is extracted as a feature value for identifying the person individually, and when the feature value is similar to that of a target person, it is estimated that they are the same person.

Feature values used for image recognition are luminance values of pixels like Eigenface used in main component analysis in old days. As the first generation feature values, those based on distribution of pixel values (luminance) and wavelet transformation have been known. In the second generation, feature values based on a local region such as Haar-Like, HOG, EOH, and Edgelet have been known, and also, those having scale invariant property regarding a focused feature point like SIFT and SURF have been known. In the third generation, learning is made in consideration of spatial relativeness of those local regions, and Joint Haar-like, Joint HOG, sparse feature, Shapelet, co-occurrence probability feature, and the like have been used.

In recent years, a time space feature such as PSA (Pixel State Analysis), as the four generation, has been researched (for example, see Non Patent Literature 2).

The performance of face recognition depends of a face image databased used for learning. FERET face database, often used in a contest, includes a right-sided face and a left-sided face, besides a front face. Regarding this database, face recognition having a FRR (False Reject Rate) of about 0.0003%, with respect to FAR (False Accept Rate)=0.001, is realized at the time of year 2010.

CBIR having an accuracy of a practical level in face recognition is expected to be used in various fields in the future.

As an example thereof, a personal safety verification system in times of disaster or the like is considered.

A safety verification means in times of disaster, which is currently used widely, is provided by a telecommunications carrier. For example, a person who wishes to verify safety (verification requesting person) or a person who is to be verified (not verification requesting person) calls a predetermined telephone number, remains a voice message with a telephone number of the other person or the own, and then the other person calls a predetermined telephone number an inputs the telephone number of the own or the other person, whereby the voice message can be played.

Further, there are also various means such as one in which safety information is input using characters from a mobile phone, a smart phone, PC, or the like, and the other person is able to search for and view the safety information using a telephone number or the like, and one in which voice can also be recorded and played with a similar operation. There is also a means for automatically send an email prompting inputting of safety information to an email address of a person to be verified.

Further, SNS (Social Networking services) and the like, which are widely used recently, may also be used as safety verification means.

It should be noted that relating to the present invention, a personal safety verification system using CBIR technology, and one in which any kind of personal information and a telephone number are paired to be used for searching, for example, have been known (see Patent Literatures 5 to 7, for example).

Further, a technology of performing identification of a human body using images has been known (see Patent Literatures 8 and 9, for example).

CITATION LIST

Patent Literature

Patent literature 1: JP-A-5-154651
Patent literature 2: JP-A-2009-027493
Patent literature 3: JP-A-2012-068717
Patent literature 4: JP-A-2013-218511
Patent literature 5: JP-A-2003-304300
Patent literature 6: JP-A-2006-254798
Patent literature 7: JP-A-9-198401
Patent literature 8: JP-A-2012-85114
Patent literature 9: JP-B2-5125424

Non Patent Literature

Non Patent Literature 1: Hiroshi SUKEGAWA and four others, "Development of a large-scale people search system using face recognition", Proceedings of Biometrics Workshop, the Institute of Electronics, Information and Communication Engineers, Aug. 27, 2012, p. 102-107, Internet <URL: http://www.ieice.org/~biox/2012/001-kenkyukai/pdf/BioX2012-18.pdf>
Non Patent Literature 2: Takayoshi YAMASHITA, "Efficient Features for Object Recognition", [online], Nov. 28, 2008, [searched on Feb. 21, 2014], Internet <URL: http://www.vision.cs.chubu.ac.jp/features/PPT/CVIM2008/ppt.pdf>
Non Patent Literature 3: Yair Weiss, et al, "Spectral Hashing", [online], [searched on Feb. 21, 2014], Internet <URL:http://people.csail.mitedukorralba/publications/spectralhashing.pdf>
Non Patent Literature 4: Anxiao Jiang, et al, "Rank Modulation for Flash Memories", [online], [searched on Feb. 21, 2014], Internet, <URL: http://www.paradise.caltech.edu/papers/etr086.pdf>
Non Patent Literature 5: Alexander Barg and Arya Mazumdar, "Codes in Permutations and Error Correction for Rank Modulation", [online], [searched on Feb. 21, 2014], Internet <URL: http://citeseerx.ist.psu.edu/viewdoc/download?doi=10.1.1.249.198&rep=rep1&type=pdf>

Non Patent Literature 6: Hisashi KOGA, "Hash-based Similar Search Techniques and Their Applications", Fundamentals Review, the Institute of Electronics, Information and Communication Engineers, Engineering Science Society, Jan. 1, 2014, Vol. 7, No. 3, p. 256-267, Internet <URL: https://www.jstage.jst.go.jp/article/essfr/7/3/7_256/_pdf>

Non Patent Literature 7: Tuyls Pim, et al, "Capacity and examples of template-protecting biometric authentication systems", ECCV Workshop BioAW, no. 77, 2004, Internet <http://eprint.iacr.org/2004/106.pdf>

SUMMARY OF INVENTION

Technical Problem

The conventional personal safety verification system as described above works under conditions that a verification target person recognizes that himself/herself is a verification target person, has a knowledge of a personal safety verification system, is able to use a communication means capable of accessing the personal safety verification system, and makes an access voluntarily and performs an action to remain a message or the like. If any one of them is not satisfied, safety verification cannot be made. For example, after occurrence of a disaster, when a person finished evacuation to a safe place and wishes to make a contact to a person having a blood relation, in a state where fixed telephones are hardly used due to congestion or line disconnection to the place, there is a possibility that a child or an elderly person who is difficult to use other communication means is unable to perform safety verification.

Further, while there are a plurality of Internet bulletins for disasters or for safety verification, most of them do not associate with each other. As such, there is a problem that a verification requesting person must performs searching and operation in each bulletin. Even if it is possible to register information of a face of a verification target person or a verification requesting person on such a bulletin, it is expected that registration is hardly made due to psychological resistant to direct publication of a face image or a fear of being collected, used, or the like by a third person.

Further, regarding a person captured by a surveillance camera, sufficient social consent is not made currently to perform face authentication (matching with a known face) in a state where the person is not aware, or collect and hold face information.

Accordingly, as a configuration of a personal safety verification system, it is considered that a distributed type in which matching is performed on the captured site is more acceptable, rather than a concentrated type in which a face to be matched is transmitted to a server or the like. In that case, a security technology for safely holding a face database is required at each location.

As a technology which allows matching between biological information units of the same person and makes it difficult to perform diversion to other usages, collection of statistical information, and the like, there is a template protection technology, for example. Fuzzy Vault, Cancelable Biometrics, Bioscript, Anonymous biometrics (see Non Patent Literature 7) and the like are known. As data protected by such a method is randomized like an encryption, it is difficult to suppose the original biological information. Further, as it is not equal length mapping, similarity in the original space must be obtained by performing a trial for each item. As such, there is no application to a large-scale high-speed search so far, as far as the inventor knows.

From the beginning, the essence of similarity search is that even though no information identical to the information to be searched is held, such information can be reached. Even if template protection is applied, as long as a similarity searching function is provided, a third party may be able to acquire desired information through the number of trials which is significantly smaller than that of typical deciphering, regardless of the system configuration. Further, there is also a risk that biological information is directly obtained from a person in secret, without using such an on-line system. As such, it is a matter of balance between the cost of acquiring them and the cost of attacking the template protection. Although the acquisition cost largely depends on the range of similarity that the search result is to be presented, as the template protection is stronger, it is likely that matching cannot be made unless the range of similarity is expanded.

The present invention has been made in view of such problems. An object of the present invention is to provide a personal safety verification system or the like in which personal safety of a verification target person can be verified, even if the verification target person is not aware that himself/herself is a verification target person, does not have a knowledge of a personal safety verification system, and is not able to directly use a communication means capable of accessing the personal safety verification system, without a need of a voluntary action.

Solution to Problem

A personal safety verification system, according to one aspect of the present invention, includes a portal server (4) that provides a database in which a plurality of sets, each including a feature value of a face of a missing person, personal information of a verification requesting person or the missing person, and a point of contact of the verification requesting person, are accumulated; and a field server (3) that acquires a copy of the database, extracts a feature value from a face image of a person captured by a camera, and searches for a similar feature value from the copy, wherein the portal server accumulates and provides the feature value of the face in a state of being applied with template protection, and when the field server succeeds in searching of the similar feature value, the field server presents the personal information corresponding the similar feature value to the captured person and asks for verification, and when accepting a verification operation from the person, notifies the point of contact of the verification requesting person.

The personal information is a telephone number, the point of contact of the verification requesting person is an email address or a telephone number, and the feature value of the face is vector data of 100 dimensions or less or having a data size of 128 bytes or less, which is reduced in dimensions by main component analysis, independent component analysis, or linear discriminant analysis, and is applied with template protection by using at least one of random projection, a one-way function, and public key encryption.

The portal server is connected with the Internet and receives the set including the feature value, to which the template protection is applied, from a terminal (2) of the verification requesting person, and when the field server has an electronic certificate or is reliable, or only in the case of emergency, the portal server provides the database, and a notification to the point of contact of the verification requesting person includes information indicating a place where the person who is verified is captured.

A similarity search method performed on data encrypted for confidentiality, according to another aspect of the present invention, includes a first step of encrypting a plurality of units of sampled data for confidentiality by mapping in which a distance is preserved at least locally in a sampled data space (S23, 44); a second step of clustering and recording a pair of the sampled data encrypted for confidentiality and arbitrary data, based on the sampled data encrypted for confidentiality itself (65); a third step of encrypting query data for confidentiality by a method same as the method used for the sampled data (S86); a fourth step of identifying a cluster in which sampled data similar to the query data is recorded, based on the query data encrypted for confidentiality; and a fifth step of identifying, from the identified cluster, a unit of sampled data similar to the query data, by calculating a distance between the sampled data encrypted for confidentiality and the query data encrypted for confidentiality, and accessing arbitrary data paired with the unit of the sampled data.

Advantageous Effects of Invention

According to the present invention, it is possible to find a verification target person and verify personal safety, without a voluntary access by the verification target person.

BRIEF DESCRIPTION OF DRAWINGS

FIG. 5 illustrates exemplary configurations of template protection units 44a to 44d of FIG. 4.

FIG. 7 illustrates an exemplary configuration of a clustering unit 65.

FIG. 9 illustrates an exemplary configuration of function means for DB searching at S87.

FIG. 12 illustrates an example of a person verification screen.

DESCRIPTION OF EMBODIMENTS

Figure 1:
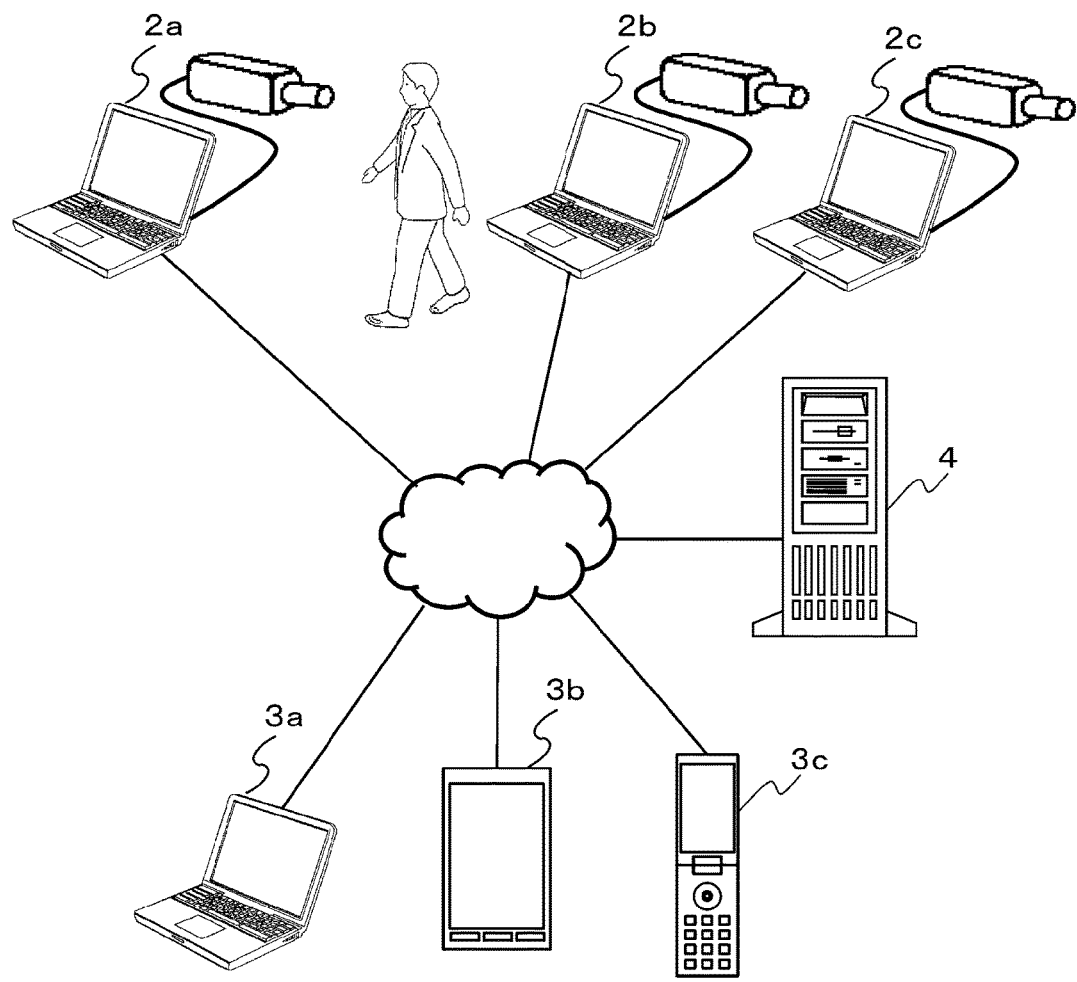
FIG. 1 is a configuration diagram of a personal safety verification system 1.

Hereinafter, an embodiment of the present invention will be described with reference to the drawings. It should be noted that in the description of the respective drawings, constituent elements having substantially the same functions are denoted by the same reference numerals and the description thereof is not repeated herein.

Embodiment 1

A personal safety verification system 1 according to an embodiment 1 will be described with reference to FIGS. 1 to 4. FIG. 1 illustrates a configuration of the personal safety verification system 1.

The personal safety verification system 1 of the present embodiment includes a plurality of field servers 2a to 2c (referred to as a field server 2 when not being distinguished from each other. The same applies hereinafter) to each of which a camera or the like for capturing a verification target person is connected, verification terminals 3a to 3c owned or operated by respective verification requesting persons and the like, and a portal server 4 which first receives an inquiry from the verification terminal 3 and performs mediation between the field server 2 and the verification terminal 3.

The personal safety verification system 1 of the present embodiment is schematically configured such that a feature value of a face image of a verification target person and information such as a telephone number are input from the verification terminal 3 and are distributed to the respective field servers 2a to 2c, and the field server performs matching between them and a face in a video image captured by the own camera. When the face of the verification target person is detected, the field server 2 generates a synthesized voice to stop the verification target person and asks the person to perform identity verification or operate for agreement appropriately, and when it is verified, the result is notified to the verification requesting person.

Figure 2:
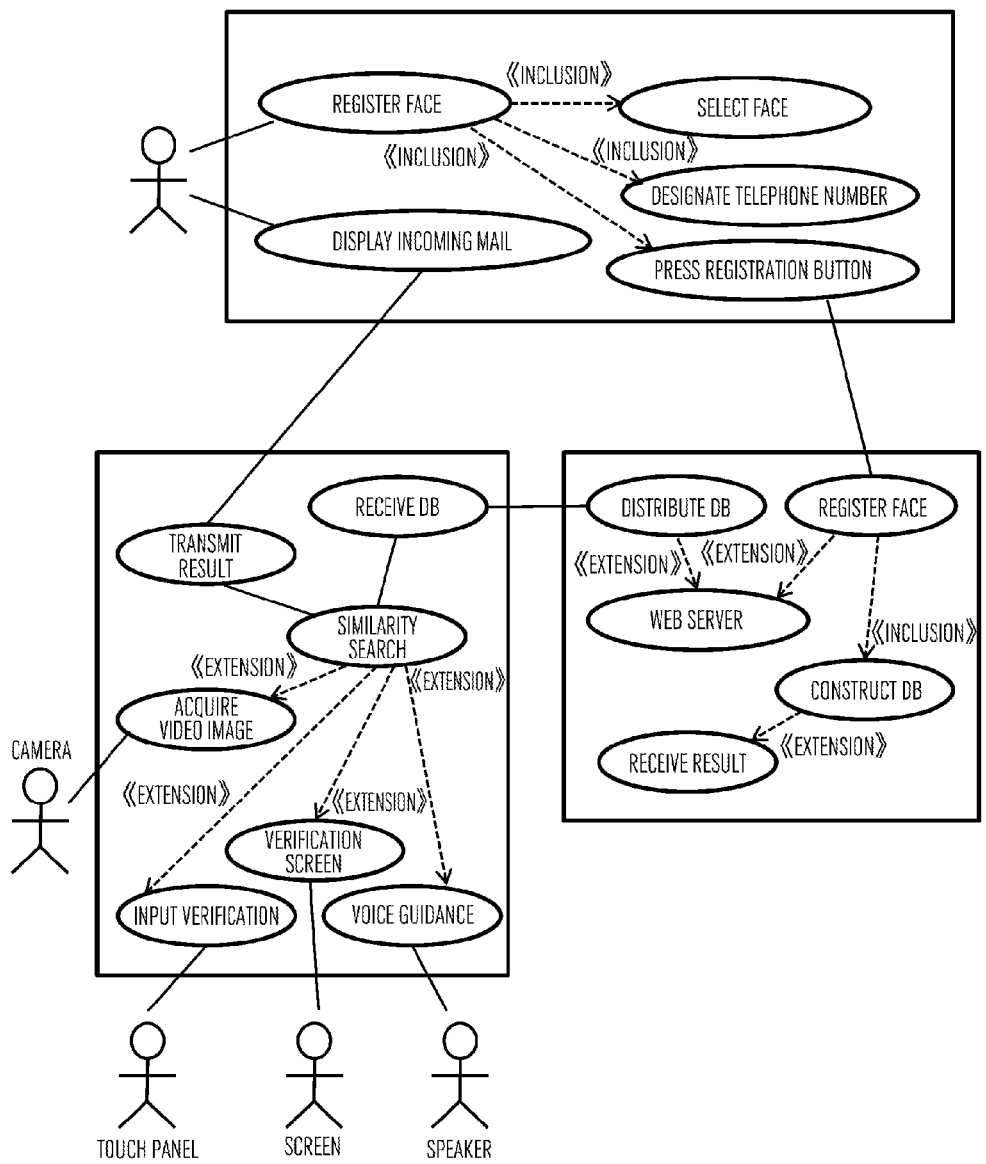
FIG. 2 is a use case diagram of the personal safety verification system 1.

FIG. 2 is a use case diagram of the personal safety verification system 1. It should be noted that FIG. 2 does not necessarily show all functions of the field server 2 and the like, and is not intended to limitedly specify the functions thereof.

The field server 2 is a personal computer, a tablet, or the like installed with a video camera for capturing faces of passers-by at a location where there are many comings and goings such as a service entrance of a shelter or a hall. When predetermined software is installed therein, the presence thereof is notified to the portal server 4, and it functions as the field server 2. The video camera is preferably one capable of capturing full-frame images with a hard disk, and the video images are input to the field server 2 via an HDMI (trademark) cable. The field server 2 includes a loudspeaker for calling passers-by, a screen that displays information for verification, and a human I/F such as a touch panel that accepts operation from passers-by. Further, it is connected to the Internet, and preferably constitutes a P2P network or an autonomous distributed database with each other. Means for connecting to the Internet are secured in a plurality of numbers including LTE data communications, satellite Internet, or the like, besides a wired line.

The verification terminal 3 is a communication terminal capable of connecting to the Internet to view websites, such as a mobile phone, a smartphone, a tablet, or a PC, and has a function for registering a face by a verification requesting person, a function of receiving and displaying a verification notice by a verification target person, and more preferably, an address book function in which a face of a person can be registered together. The function of registering a face includes a function of selecting a face by a verification requesting person, a function of designating a telephone number or the like, and a function of pressing a send button.

The portal server 4 is a web server having a public IP address. The portal server 4 provides the terminal 3 with a web page for registering the face of a verification target person, accumulates the registration information received from the terminal 3 to construct a database (DB), and distributes it to the field server 2. Further, it receives, from the field server 2, a notification that a verification target person is verified, and reflects it on the database as required. Furthermore, it uses an external or internal SMTP server to notify the verification target person.

Figure 3:
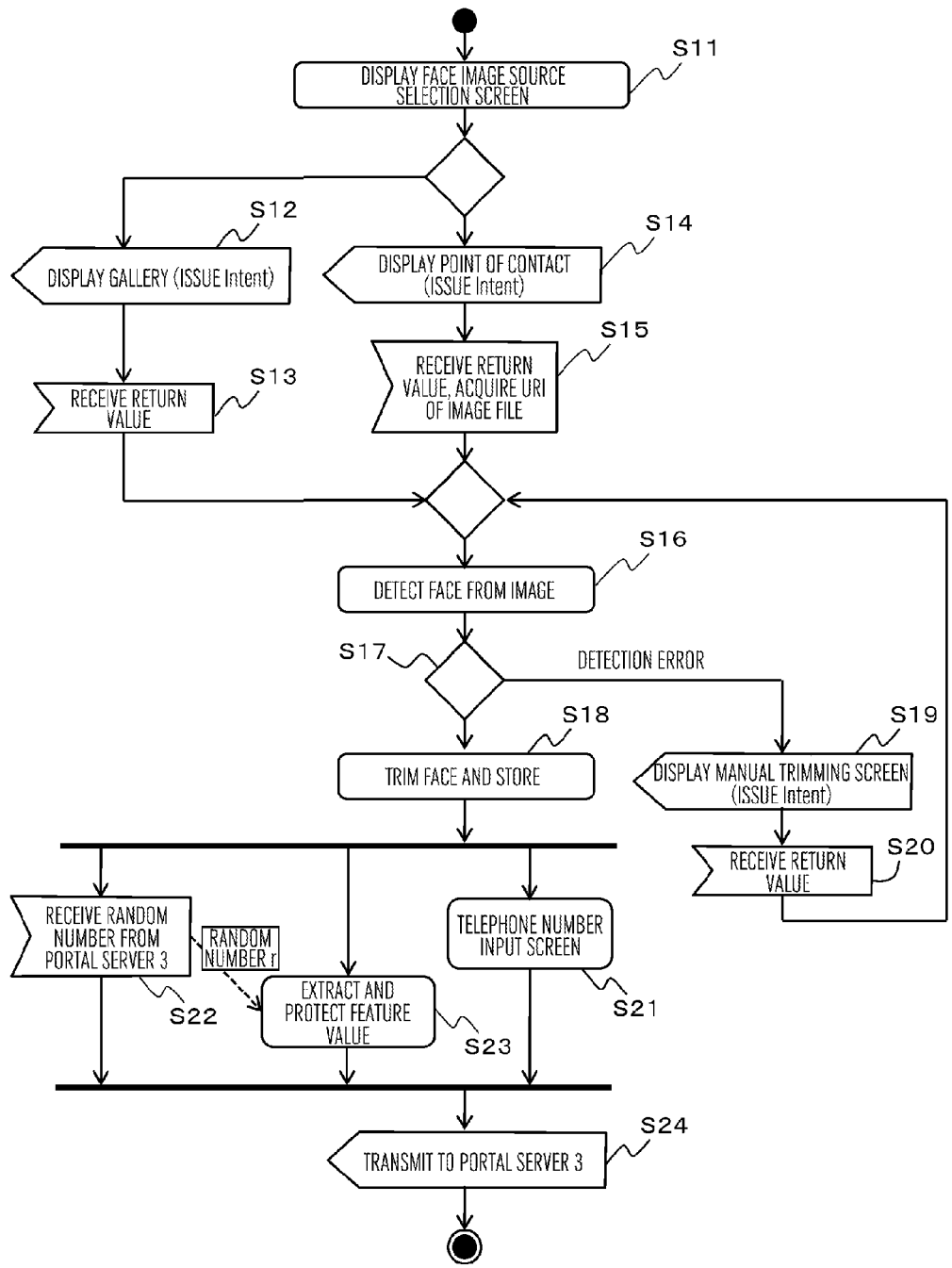
FIG. 3 is an activity diagram of a function of registering a face in a verification terminal 3.

FIG. 3 is an activity diagram of the function of registering a face in the verification terminal 3. In the present embodiment, it is assumed that the verification terminal 3 is an Android (trademark) terminal, and that a face registration application is installed in advance. The main body of this application is an execution code on a java virtual machine, and is desirably obfuscated.

When the face registration application is started, first, a face image source selection screen is displayed as step S11. On this screen, as a face image source, a user designate whether to select from an arbitrary image file stored in the verification terminal 3 or select from points of contact (address book).

When an arbitrary file is designated as a face image source, gallery display is performed as step S12. Specifically, the step includes generating an instance of Intent, designating that the target is an image by setType method, designating that an object is selection of an item by setAction method, performing gallery display by startActivityForResult method, and issuing Intent for acquiring a result of file designation by the user as a return value. The Intent is processed appropriately on the OS side, whereby a gallery display application or the like is started.

As step S13, a return value of the gallery display of S12 is received by onActivityResult method. As the screen of the verification terminal 3 is changed in cooperation with the Intent, when the Intent is returned, the screen returns to displaying of the registration application.

Meanwhile, when points of contact are designated as a face image source at S11, the points of contact are displayed as step S14. Similar to S12, while Intent is generated by startActivityForResult, as a request code, PICK_CONTACT is designated rather than GALLERY.

As step S15, a return value of displaying of the points of contact at S14 is received by onActivityResult method. The return value is URI of a ContactsContract.Contacts class indicating a person selected from the points of contact. It should be noted that it is possible to acquire URI accessible only once by using a Grant-uri-permission function. Then, cursor instance is generated by a getContentResolver.query method, and URI of an image file, which is the same as the return value of S13, is obtained using the cursor. Further, the telephone number of the person may be acquired at this point.

As step S16, face detection is performed using an android-.media.FaceDetector class. Specifically, a Bitmap instance is generated by BitmapFactory.decodeFile method designating URI of the image file, a FaceDetector instance is generated using properties of the width and height of the Bitmap instance, for example, and recognition is made by findFaces method with respect to the FaceDetector instance. The return value is the number of recognized faces, and the detailed results (distance between eyes, coordinate of face center, face inclination, reliability) are stored in FaceDetector.Face.

As step S17, it is determined whether or not an error has occurred in the detection at S16. It is determined that an error has occurred when the number of faces is zero, or there is no face in which the reliability is a predetermined value or larger. When an error has occurred, the step diverges to step S19.

As step S18, cutting out (trimming) of a face is performed. Specifically, by the createBitmap method in which the original Bitmap and the cutout position are designated, a new trimmed Bitmap instance is obtained. The cutout position is calculated under a certain rule, based on the FaceDetector.Face property of the face having the highest reliability. Then, a FileOutputStream instance is generated with a predetermined file name, and by the Bitmap.compress method designating a file output instance thereof, it is stored as an image file.

It should be noted that in the case where a face is applied to a predetermined three-dimensional model (an ellipsoid, for example) to correct the face orientation, the image is divided, and postRotate or postSkew method of a Matrix class is applied to each of them, and then they are synthesized into one image.

Meanwhile, when it is determined that there is an error at S17, a manual trimming screen is displayed as step S19. Similar to S14, while Intent is issued with startActivityForResult, as URI of intent.setData(uri), URI of the image file used at S16 is designated, and as URI of putExtra(MediaStore.EXTRA_OUTPUT, uri), URI of the storage file which is the same as that of S18 is designated.

As step S20, by the onActivityResult method, a return value of the manual trimming performed at S19 is received, and the processing moves to S16. While the return value to be received here can be used for error processing as appropriate, the description thereof is omitted herein.

Subsequent to S18, step S21, step S22, and step S23 are asynchronously operated in parallel.

At step S21, communications are established with the portal server 4, and a random number for protecting a template is received from the portal server 4.

At step S22, a screen for accepting an input of a telephone number is displayed. This screen includes a textbox to which a number can be input, a radio box for designating a distinction (referred to as a number type) indicating whether the input telephone number is of a verification requesting person (that is, an operator of the search terminal 3) or of a verification target person (that is, a person of the face to be registered), and a send button. It is more preferable to display a face image of a verification target person stored at S18, and display a confirmation message that "when you press the send button, feature value information of this face is sent to the server together with a telephone number or the like".

It should be noted that when the telephone number of the verification target person has been acquired at S15, it may be displayed in a state of being input in the textbox. It should be noted that the telephone number of the verification terminal 3 itself is not acquired automatically, because it is not particularly troublesome to input it on the site by the operator.

Further, it is also acceptable to allow telephone numbers of both the verification requesting person and the verification target person to be input, and to allow additional personal information (age, sex, other physical features, email address, SNS account, handle name, office (school), etc. of the verification target person) to be input arbitrarily.

When it is detected that the send button is pressed finally, the telephone number, the number type, and additional personal information, having been input at that time, are stored.

At step S23, a feature value is extracted from the face image of the verification target person, and template protection is applied, to thereby generate a "protected feature value" to be transmitted to the server. To perform the template protection, as the random number received at S21 is required, S23 is suspended until the random number is obtained. It should be noted that the data size of the protected feature value is about 100 octets. Regarding the processing at S23, it is desirable to be processed by a native code via JNI (Java Native Interface) or the like in order to complete it within several minutes and for obfuscation.

Those available from a native library include openCV for Android. API for native (C/C++) is also disclosed besides API to be used from Java.

When steps S21 to S23 are completed entirely, next, as step S24, the telephone number, the number type, and the like input on the screen at S22 and the protected feature value generated at S23 are transmitted to the portal server 2 using HTTP/TLS protocol or SMS (Short Message Service). In the case of using a short message, the feature value is Base64 encoded.

Figure 4:
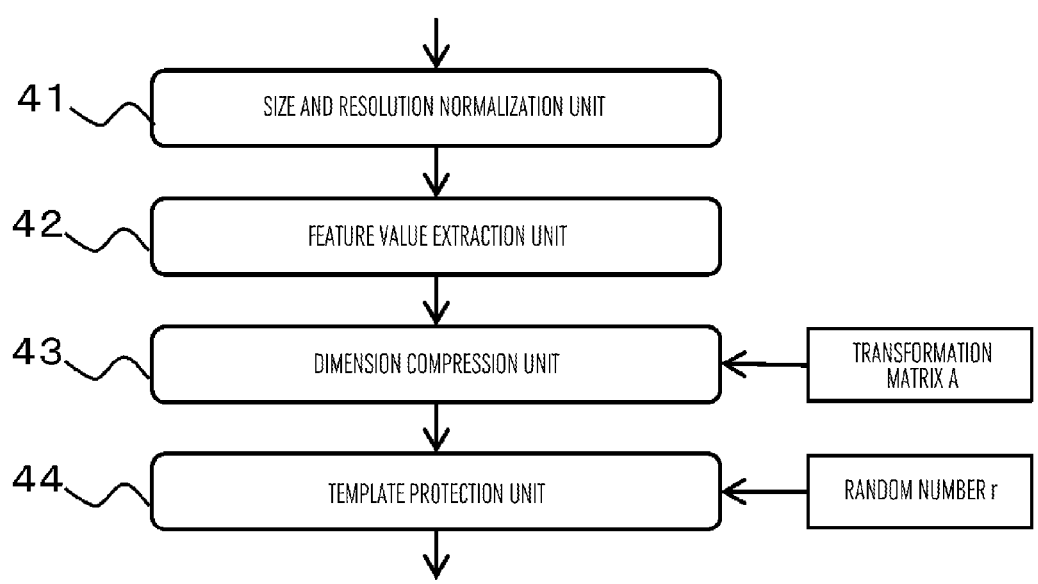
FIG. 4 is a functional block diagram illustrating feature value extraction processing at S23 of FIG. 3.

FIG. 4 is a block diagram illustrating the feature value extraction processing at S23 in FIG. 3. A size and resolution normalization unit 41 resizes a received face image to be in a predetermined size (width and height), and normalizes the resolution and contrast. The resolution immediately after resizing depends on the size or the resolution of the original image, and it varies. As such, a feature value (or feature points) to be extracted also varies. As such, by constantly removing components of a certain frequency or higher by LPF such as a Gaussian filter or detecting an edge or the size of a high-frequency component, a sharpening/blur filtering process corresponding to the value is applied. Further, a luminance histogram is calculated as required, and the contrast is normalized based on it. It should be noted that such normalization process can also be performed after the feature value extraction.

The feature value extraction unit 42 extracts a feature value from a normalized image from the size and resolution normalization unit 41. As the feature value, various types of publicly-known ones, as described in Non Patent Literature 2, can be used. In this example, a normalized image is divided into small blocks, histogram regarding frequency of edge patterns of each small block is obtained, a column vector obtained by aligning respective bin values of the histogram in a line under a predetermined rule is used as a feature value, and the dimension thereof reaches about 1000.

A dimension compression unit 43 accepts an input of a feature value from the feature value extraction unit 42, converts it into a feature value of a smaller dimension, and outputs it. Basically, a method such as principal component analysis (PCA), linear discriminant analysis (LDA), or independent component analysis (ICA) is used. This means that from feature values having been extracted from faces of people (samples), a variance-covariance matrix or the like is obtained, and a transformation matrix (projection matrix) A composed of the eigenvector thereof is prepared. In the transformation matrix A, a coefficient for causing the scale of each main axis after transformation to be constant is multiplied. The dimension compression unit 43 simply multiplies the input feature value by the transformation matrix to thereby obtain a normalized lower-dimensional feature value. The number of rows of the transformation matrix A (dimensions of the lower-dimensional feature value) is considered to be sufficient if it is about 100 for PCA or LDA and about 20 to 30 for ICA, although it depends of the number of samples.

The transformation matrix A is common in the entire system, and it is not changed during operation, basically. Further, normalization by the dimension compression unit 43 is not prerequisite.

The main axis obtained by ICA is similar to the appearance features that a person is aware of when he/she tries to remember the face of another person. For example, there is an axis well reflecting presence or absence of beard, presence or absence of glasses, or the like. Such an axis having no invariant feature may be less weighted or removed.

The transformation matrix obtained by PCA or the like has a normal orthogonal base, and a distance relationship is well kept after the dimension compression. As one having such a characteristic, RP, described below, can also be used, and LSH (Locality Sensitive Hashing) can be used auxiliarily.

A template protection unit 44 applies a one-way function, random projection (RP), public key encryption, or the like to the lower-dimensional feature value from the dimension compression unit 43, and outputs a feature value (or code) encrypted for confidentiality.

Figure 10:
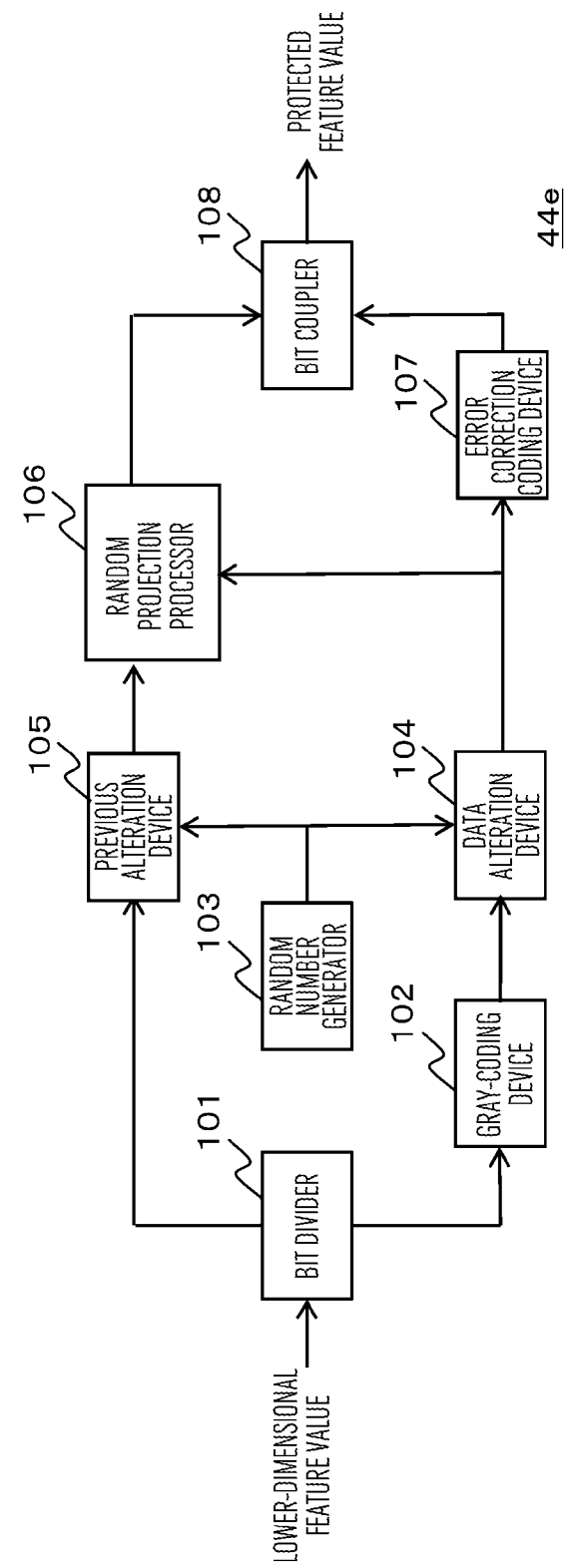
FIG. 10 illustrates an exemplary configuration of a template protection unit 44e.

FIGS. 5 and 10 illustrate five variations of the configuration of the template protection unit 44.

A template protection unit 44a in the example of FIG. 5(*a*) shows implementation in which Anoymous biometrics (see Non Patent Literature 7) is simplified considerably. The template protection unit 44a includes a quantizer 51 for quantizing a lower-dimensional feature value, a hash calculator 52 which performs cryptographic hash processing on the quantized feature value, and a subtracter 53 which subtracts the quantized feature value from the lower-dimensional feature value before quantization.

The quantizer 51 is configured to discretize the input lower-dimensional feature value more roughly, using LSH, for example. In this example, as the lower-dimensional feature value has been processed by PCA and the scale is normalized, it functions as a type of PCH (Principal Component Hashing). Simply, it is only necessary to equally divide the component value of each axis into a plurality of sections, which can be achieved by extracting the high-order digit (high-order bit) of the component value. To prevent information loss, while the bit length $B_d$ of a discretized feature value may preferably be less than the bit length $B_h$ output from the hash calculator 52, there is little difference in practice. Rather, the bit length $B_d$ should be selected such that the bit length Bt (sum of the bit length Br of the residual output from the subtracter 53 and the bit length $B_h$) output from the template protection unit 44a becomes a desired value.

The hash calculator 52 outputs the discretized feature value as a hash value of a certain bit length $B_h$, according to an algorithm such as SHA-1.

In the case where the input lower-dimensional feature value is near the boundary of quantization (there are a plurality of quantized values having quantization residuals of the same size), the template protection unit 44a may output sets of a hash value and a residual corresponding to the quantized values).

The discretized feature value corresponds to helper data of Anoymous biometrics.

It should be noted that the template protection unit 44a does not use the random number of S21 in FIG. 3.

FIG. 5(*b*) illustrates an example of cancelable biometrics using RP. A template protection unit 44b of this example includes a conversion parameter generation unit 54 which generates parameters from the random number received at S21 of FIG. 3, under a predetermined rule, and a conversion unit 55 which converts the lower-dimensional feature value based on the generated parameters.

The conversion parameter generation unit 54 obtains a random projection matrix by exchanging rows or columns or performing negation on a prepared matrix $B_d \times B_d$ according to the random number under a predetermined rule, for example. It is also possible to receive this RP matrix from the beginning as random numbers. The prepared matrix is desirably a unitary matrix, or it may be a unit matrix or an RP matrix in which normal random numbers or uniform random numbers are used for each element.

The conversion unit 55 multiplies the lower-dimensional feature value (column vector) from the dimension compression unit 43 by the RP matrix, and outputs the result to the template protection unit 44*b*.

While the template protection unit 44*b* has been described here that it does not perform dimensional compression, it is the same as the dimension compression unit 43 in that it only performs multiplication of a matrix. As such, it is possible to integrate these processes. This means that it is only necessary to exchanges rows of the transformation matrix A based on the random numbers, for example.

In the cancelable biometrics, when a secret random number or a protected feature value is leaked, impersonation or the like caused by the leaked information is prevented by updating the random number and performing RP again on all of the stored feature values with the new random number.

With only RP, there might be an attack to estimate the component by applying PCA to the sample after RP to restore the original feature value or a face image. However, in this example, as PCA and normalization are performed before RP, each component seems to be independent, whereby it is more difficult to perform such analysis.

As the RP of the present embodiment is unitary conversion or conversion similar to it, the distance relationship is kept well after the conversion.

FIG. 5(*c*) illustrates an example of RP having certain confidentiality if a secret random number is not given. A template protection unit 44*c* of this example includes, in addition to the template protection unit 44*b*, a coding unit 57 which performs at least one of hash function, error correction decoding, vector quantization, distance preserving run length limited code, permutation code, distance preserving mapping (DPM), rank modulation decoding, and the like. It may also include another mapping unit 58 if necessary. The template protection unit 44*c* performs random projection using an RP matrix which is randomized using a tuple (code, vector, or the like) uniquely determined from the lower-dimensional feature value, rather than a given random number.

The tuple can use a roughly quantized feature value (hash value), similar to the case of the template protection unit 44*a*, for example. For example, a tuple is cut out each 8 bits, and a row designated by the value of an odd number word (0 to 127) and a row designated by the value of an even number word are exchanged, whereby the RP matrix is randomized. As lower-dimensional features quantized to the same bucket receive the same random projection, the distance relationship is preserved. However, the distance is not preserved if the buckets are different. This method is advantageous if the confidentiality is considered important.

The fact that the RP matrix corresponds to the quantized feature value one to one suggests that the RP matrix may be presumed from the size of each component of the protected feature value. However, if sign inversion operation is included in randomization, presumption can be more difficult. Randomization of the RP matrix can include any operation to maintain unitarity (approximately), besides exchange between rows and columns or sign inversion, and these operation is kept secret as much as possible.

Here, a method of mapping adjacent buckets in a state of being adjacent to each other, while maintaining a random projection method, will be considered. One answer is, regarding RP matrixes of adjacent buckets, allowing Hamming distance between tuples thereof to be the smallest (1) so as to have a relationship in which any two rows (or columns) are exchanged. Spectral Hashing which is derivation of LSH realizes it. In Spectral Hashing, a concept of a space frequency (mode) is introduced, and a space between the maximum value and the minimum value of the main axis is divided into the number twice as large as the number of modes, and they are coded to either 0 or 1 of a binary code alternatively, whereby binary codes having a bit length which is the same as the number of main axes are obtained. More simply, it is only necessary to binarize the components of the respective main axes of PCH (LSH), and in the case where it is desirable to express the respective components multiple values, Gray code is used.

In the field of coding theory, codes for preserving or enhancing hamming length has been known, including distance preserving run-length limited code, permutation code, distance preserving mapping (DPM), and the like. Further, Rank Modulation developed for error correction in a flash memory of a Multi-Level Cell type can also be used recently. As these are ones handling binary codes basically, it is necessary to convert the lower-dimensional feature value, which is binary-expressed multiple value information, into binary codes.

The mapping unit 58 performs this conversion, and performs mapping using Gray code, for example.

FIG. 5(*d*) illustrates an example using public key encryption. A template protection unit 44*d* of this example includes a public key encryption unit 60 which encrypts the lower-dimensional feature value based on the random number (public key) received at S21 of FIG. 3.

The public key encryption unit 60 encrypts the lower-dimensional feature value with McElice cryptosystem or Niederriter cryptosystem using Goppa code, Low-density parity-check code, for example. McElice cryptosystem uses k×n generator matrix G, k×k regular matrix S, and n×n transposed matrix P as a secret key, and uses G'=SGP as a public key. While this cryptogram has vulnerability in part of a polynomial expression serving as a code, there are advantages that the computation cost for encryption and decryption is low and it is less likely to be decoded by a quantum computer.

FIG. 10 is a configuration diagram of a template protection unit 44*e*. The template protection unit 44*e* is one in which random data alteration and error correction are combined with the idea of the template protection units 44*a* to 44*c*.

A bit divider 101 divides the input lower-dimensional feature value into the highest 1 to 2 bits in the binary expression and the residual bits, and outputs them as a quantized feature value and a residual feature value, respectively. They corresponds to outputs from the quantizer 51 and the subtracter 53 of the template protection unit 44*a*.

A Gray-coding device 102 applies Gray-coding to the quantized feature value. It should be noted that it is unnecessary if the bit divider 101 extracts only one highest bit.

A random number generator 103 generates random numbers from time to time.

A data alteration device 104 performs alteration by reversing one bit at a predetermined position of the Gray code, under a predetermined rule corresponding to the random number from the random number generator 103.

A previous alteration device 105 alters a part of the residual feature value, under a predetermined rule corresponding to the random numbers from the random number generator 103. For example, with respect to a component determined by the random number, it applies sign inversion, a template protection method such as block scramble, morphing, or the like, for example. It should be noted that in the initial stage of searching, as rough similarity search is performed with a feature value altered by the previous alteration device 105, the amount of alteration at this point should be larger (than feature value dispersion of a single person) to the extent that it is difficult to identify a person, and smaller to the extent that it can be found through rough similarity search.

An RP (Random Projection) processor 106 generates an RP matrix, under a predetermined rule corresponding to the altered Gray code from the data alteration device 104, and performs multiplication on the input lower-dimensional feature value. An RP matrix is required such that even if an RP matrix is known, the original Gray code or the lower-dimensional feature value is less likely to be estimated, and alteration of Gray code contributes to this requirement.

An error correction coding device 107 is a RS (Reed-Solomon) encoder, for example, and outputs a redundant symbol.

A coupler 108 couples a feature value to which RP is applied by the RP processor 106 and the redundant symbol, and outputs it as a protected feature value.

Figure 6:
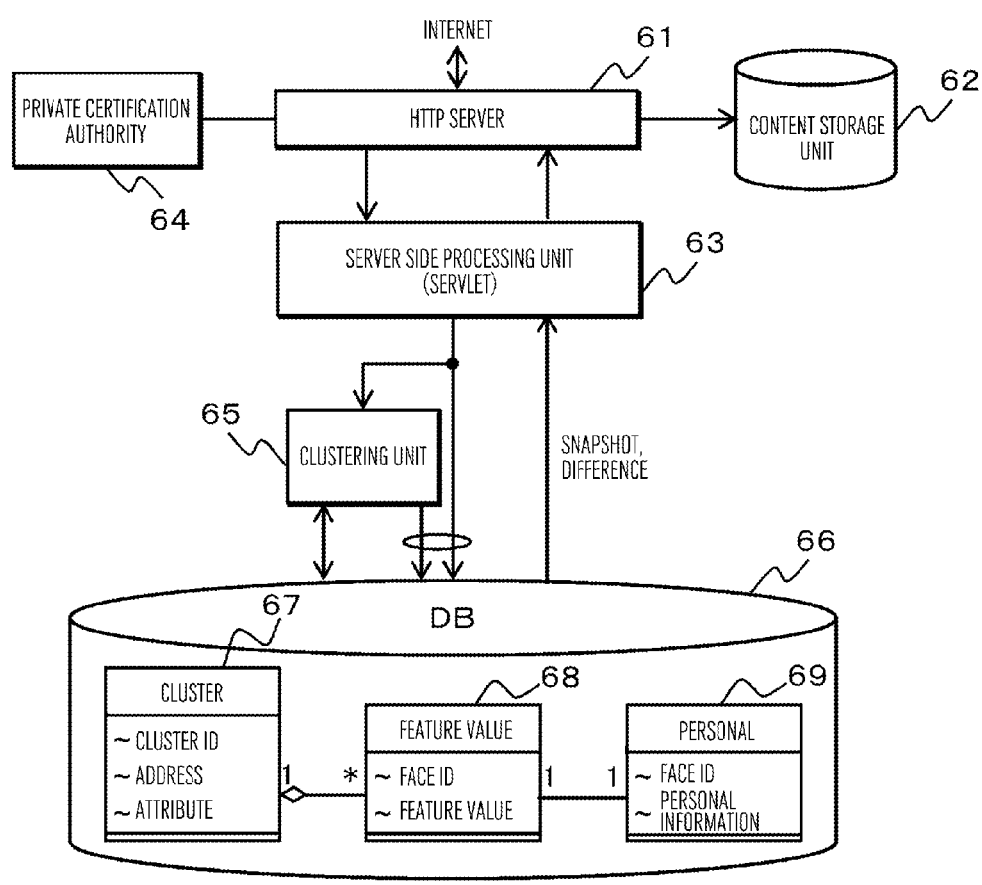
FIG. 6 is a functional block diagram of a portal server 4.

FIG. 6 is a functional block diagram of the portal server 4 of the personal safety verification system 1 of the present embodiment. The portal server 4 of the present embodiment is constructed in LAMP/LAPP environment.

An http server 61 is an Apatch HTTP server and Openssl, for example. Basically, it provides static content such as a page introducing the website on the Internet stored in a content storage unit 62, and receives an http message for requesting face registration from the search terminal 3.

Further, in response to a request from the field server 2, the http server 61 sends snapshot of DB described below or difference patch. At that time, it is desirable to use SSL communication at least a normal time. The http server 61 has a server certificate acquired from public CA in advance.

The content storage unit 62 stores, in addition to the top page, static content prepared in advance, such as a page for face registration to be executed and displayed by a web browser of the search terminal 3, a page guiding to the provider of a face registration application which should be downloaded to the search terminal 3, and snapshots of DB 66 and difference patch described below.

A server side processing unit 63 is a Java (trademark) Servlet, for example, and governs operation as the portal server 4. For example, it divides the main body of an http message of a face registration request into personal information such as a telephone number and a protected feature value, and preforms processing to register them in the DB 66 by controlling a clustering unit 65 described below. Further, it allows the DB 66 to create snapshots or the like, and stores a file in which they are compressed in the content storage unit 62.

The server side processing unit 63 is further able to perform a higher order function operating on a Java virtual machine, and is able to perform distribution using server oriented P2P technology such as BitTorrent DNA (BitTorrent is a trademark).

A private certification authority (CA) 64 is a part of an Openssl function, for example, and issues an original certificate, in which the private CA 64 is the root, to the field server 2 not having a certificate. If possible, a public CA is desirable. The case where a certificate is given to the field server 2 is that the server is managed by a public institution such as a government office or municipality, an educational institution, or other organization with high public characteristics (designated public institution, etc.), by an online method that an IP address is found through whois service or an offline method that application is made by a document or the like. An issued certificate can be used continuously even if the IP address is changed in disasters.

The clustering unit 65 classifies the protected feature value to any of a plurality of clusters in a state of being protected or by releasing the protection, and outputs the cluster ID. A cluster is a group of feature values in the proximity to each other. In order to realize similarity search (pseudo nearest search) with O (n log n) relative to the number of face registrations n, the respective clusters are required to be controlled such that the numbers of registrations (cluster size) are equalized as much as possible. In most of well-known clustering methods, a distance between clusters or inside a cluster is measured, and based on it, performs integration or division of the clusters is performed or classification criteria of the clusters is updated. The clustering unit 65 of the present embodiment stores statistical information or classification criteria of clusters necessary for distance calculation in the DB 66 as required, and updates the classification criteria at predetermined timing.

The DB 66 stores a cluster table 67, feature value tables 68 of the same number as the number of clusters, personal tables 69, and the like in a storage medium such as a hard disk, and executes registration, update, deletion, and the like of data with respect to the tables.

The cluster table 67 holds the location (leading addresses) and attributes (the number of registrations, statistical information in the cluster, classification criteria, etc.) of each cluster, with an actual cluster ID being used as a main key.

The feature value table 68 is an entity of each cluster, and holds a feature value classified to the cluster, with a face ID being used as a main key.

The personal table 69 holds a personal information of the person (verification target person) of a face and personal information of a registrant, with a face ID being used as a main key. The personal information includes a telephone number or an email address of a registrant for making a contact with the registrant. A face ID is an ID uniquely given to each registered face.

It should be noted that as a function of the DB 66 itself, those tables may be encrypted to be recorded.

FIG. 7 illustrates an exemplary configuration of the clustering unit 65. The clustering unit 65 has a plurality of variations corresponding to the variations of the template protection unit 44.

FIG. 7(*a*) illustrates a clustering unit 65*a* corresponding to the template protection unit 44*a*. A separator 71 separates a protected feature value input therein into a cryptographic hash value and a quantized residual. The cryptographic hash value has no distance preserving property at all, and it is impossible to perform distance measurement between feature values of different hash values. As such, a boundary of quantization and a boundary of cluster in the template protection unit 44*a* must conform to each other. In this example, an aspect of associating one hash value with one cluster (one to one) is used as a basis, and an aspect of associating one hash value with a plurality of clusters (one to many) is used exceptionally.

A cluster dividing unit 72 is used for dividing an excessively large cluster. The cluster dividing unit 72 acquires the size from a cluster table 67*a*, and when it is a prescribed size, divides the cluster into clusters of the number that (current size/prescribed size) is converted to an integer by using a well-known clustering method. As a clustering method, hierarchical clustering such as a k-means method, a division rule method, or a Ward method, or one class SVM (only dividing into two) can be used. Then, to each cluster after division, a division index is given and an attribute of the cluster such as the center of gravity is recorded on the cluster table 67a.

A shortest search unit 73 searches for a hash value unit of a cluster ID from the cluster table 67a with the hash value of the feature value to be registered in the DB 66, and acquires the cluster ID thereof and the like. When there are a plurality of clusters of the same hash value, the shortest search unit 73 determines a cluster to be classified based on the readout cluster attribute (the center of gravity), and outputs the cluster ID thereof. When only one cluster matches, the shortest search unit 73 outputs a division index of the cluster. When there is no cluster corresponding to the hash value, the shortest search unit 73 creates a new cluster. At that time, the division index is 0.

Assuming that one in which a hash value and a division index are linked is used as a cluster ID and a bit length $B_{ID}$ is 128, even if there are one million items of face registrations, necessary recording capacity of the cluster table 67a is about 24M bytes at most, which does not disturb the on-memory DB. Searching of the cluster table 67a can be performed easily by binary search if it is sorted by cluster IDs.

FIG. 7(b) illustrates a clustering unit 65b corresponding to the template protection unit 44b. The protected feature value input therein is applied with random projection by a fixed RP matrix, which can be deemed as equal length mapping, substantially. Accordingly, any clustering method can be used. For example, LSH-Link, described in Non Patent Literature 6, is used. LSH-Link is a kind of hierarchical clustering, and LSH is used for approximate calculation of an inter-cluster distance (shortest distance). This is applicable to a complete linking method, besides a single linking method. In LSH-Link, distance calculation is performed focusing on elements (feature values in this example) of the same hash value belonging to different clusters.

An LSH unit 74 reads hash function information representing the roughness of LSH stored, as one type of the attribute information, into the cluster table 67b of the DB 66, and calculates the hash value of the protected feature value to be input according to it.

The cluster table 67b has a dictionary in which a hash value (bucket) and an ID of a cluster to which the hash value belongs are associated with each other. By using the hash value as an argument, a cluster ID can be read simply. The dictionary includes a plurality of versions in which the roughness of LSH is different. During trial of clustering, the dictionary is configured to be able to, for each hash value, hold a plurality of cluster IDs (immediately previous version) from which the hash value is obtained and the feature values thereof, and use them for distance calculation.

A distance calculator 75 calculates a distance (Manhattan distance) between the feature values of the same hash value.

An update unit 76 compares the distance obtained by the distance calculator 75 with the roughness of LSH, determines whether or not the cluster to which the feature values having the distance belongs should be merged, creates a dictionary of a new version, and updates the cluster table 67b.

It should be noted that in the template protection unit 44b exemplary shown, in a usage that a face of the same person is registered a number of times, it is desirable to perform clustering corresponding to feature value distribution of each person actually registered in the DB 66 so as to reduce the case of classifying a single person in a plurality of clusters as much as possible.

As a clustering unit 65c corresponding to the template protection unit 44c is the same as the clustering unit 65a or the clustering unit 65b, it is not shown. The clustering unit 65b may be used if it is expected that adjacent quantized lower-dimensional feature values are projected in a state of being adjacent to each other by a similar RP matrix, while if not, the clustering unit 65a may be used.

FIG. 7(c) illustrates a clustering unit 65d corresponding to the template protection unit 44d. The configuration of the clustering unit 65d is that an encryption decoding unit 78 is simply added to the clustering unit 65b, so that the details thereof is not described herein. This means that a protected feature value is temporarily decoded to a lower-dimensional feature value by the encryption decoding unit 78, and based on the lower-dimensional feature value, by applying an arbitrary clustering method, a cluster ID to which the protected feature value should belong is determined. It should be noted that in the DB 66, the feature values are registered in clusters.

A clustering unit 65e corresponding to the template protection unit 44e can be realized in a similar manner to that of the clustering unit 65a or the clustering unit 65b. When based on the clustering unit 65a, the clustering unit 65d uses a redundant symbol included in the t protected feature value input thereto as an initial cluster ID. A large cluster may be divided appropriately. Even when based on the clustering unit 65b, a redundant symbol can be used as a part of a hash value (not affected by RP).

Figure 8:
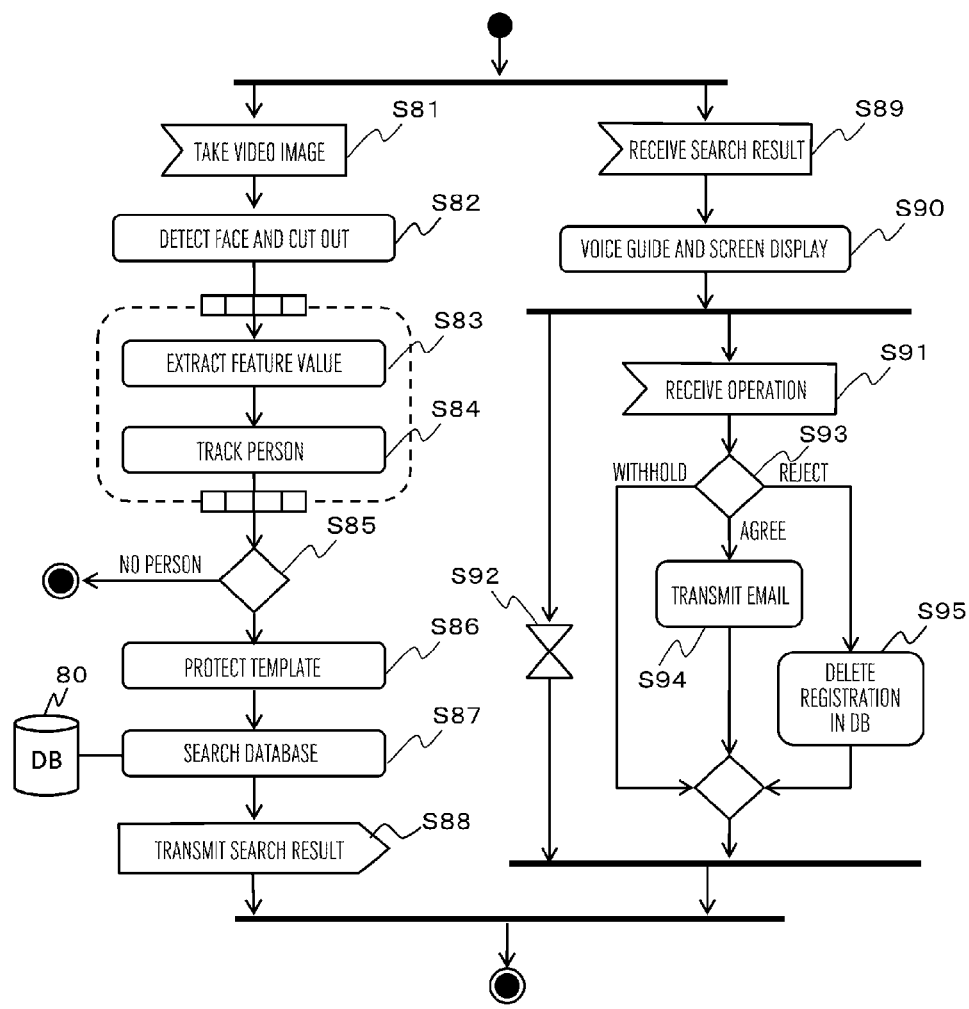
FIG. 8 is an activity diagram of a function of searching for a similar face in a field server 2.

FIG. 8 is an activity diagram of a function of searching for a similar face in the field server 2. This searching function is configured of a driver for connecting with a video camera and extracting a moving image frame, and a search application program. In this application, a code of the part for template protection processing and similarity search is encrypted by a cracking prevention tool, and dynamic analysis by disassemble or soft debugger is made difficult. When the application is first started, a snapshot in the DB 66 is downloaded from the portal server 4 using a certificate, and thereafter a difference patch is downloaded periodically to update a local DB 80. Further, a character string indicating the location where the camera of the field server 2 is installed (for example, "XYZ primary school shelter in ABC town") is set.

The activity diagram shows that a core process of searching beginning from step S81 and a process in appearance such as a user interface beginning from S89 always operate in parallel.

First, at step S81, the latest one frame, captured by a video camera, is taken.

Next, at S82, face detection is tried from the one frame image using a publicly known algorithm such as AdaBoost. When one or more faces are detected, the images are cut out and are output together with attribute information such as a position in the frame and reliability.

Next, as S83, for each of the detected faces, a process which is the same as that performed by the feature value extraction unit 42 and the dimension compression unit 43, shown in FIG. 4, is performed.

Next, as S84, a tracking process is performed using a tracking target personal table. In the tracking process, for each of a newly extracted feature value and the attribute information thereof, matching is performed using the tracking target personal table to check whether or not they are similar to the feature values and the attribute information extracted previously (within several seconds, for example). When there is no similar one, the feature value is added to the table along with the registration time. If the reliability of the new feature value is a predetermined value or higher and the output flag in the tracking target personal table is false, the feature value is output and the output flag is updated to true. The feature value having an old registration time in the table is deleted.

By the tracking process, a searching process to be performed subsequently can be narrowed down to the frequency of a level that the entire number can be processed.

Next, as S85, it is determined whether or not a person who should be searched for is output in the tracking process of S84, and if there is no output, the processing on the current frame ends.

Next, as S86, template protection is performed by processing which is the same as the processing by the template protection unit 44 shown in FIG. 4. The protected feature value is used as a search query. It should be noted that in the case of the template protection unit 44e, iterative processing described below is performed between S86 and the following S87.

Next, as S87, a (nearest) feature value similar to the query feature value given at S86 is searched from the DB 80. The DB 80 includes a cluster table 91 having the same content as that of the DB 66, a feature value table 92, and a personal table 93. The cluster structure in the portal server 4 is maintained as it is. Similar feature values are aggregated in a cluster. Multi-stage searching is performed in such a manner that one to several pieces of search target clusters are searched, and searching is further performed in the clusters. As such, searching can be made at a high speed even though there are several hundred thousands or more registrations. Further, as the size of one feature value is as small as 128 bytes, even if there are eight million items, it is as small as 1G byte. As such, super-high speed searching on memory is also realistic. Hereinafter, the details of DB search will be described for each type of template protection.

Figure 11:
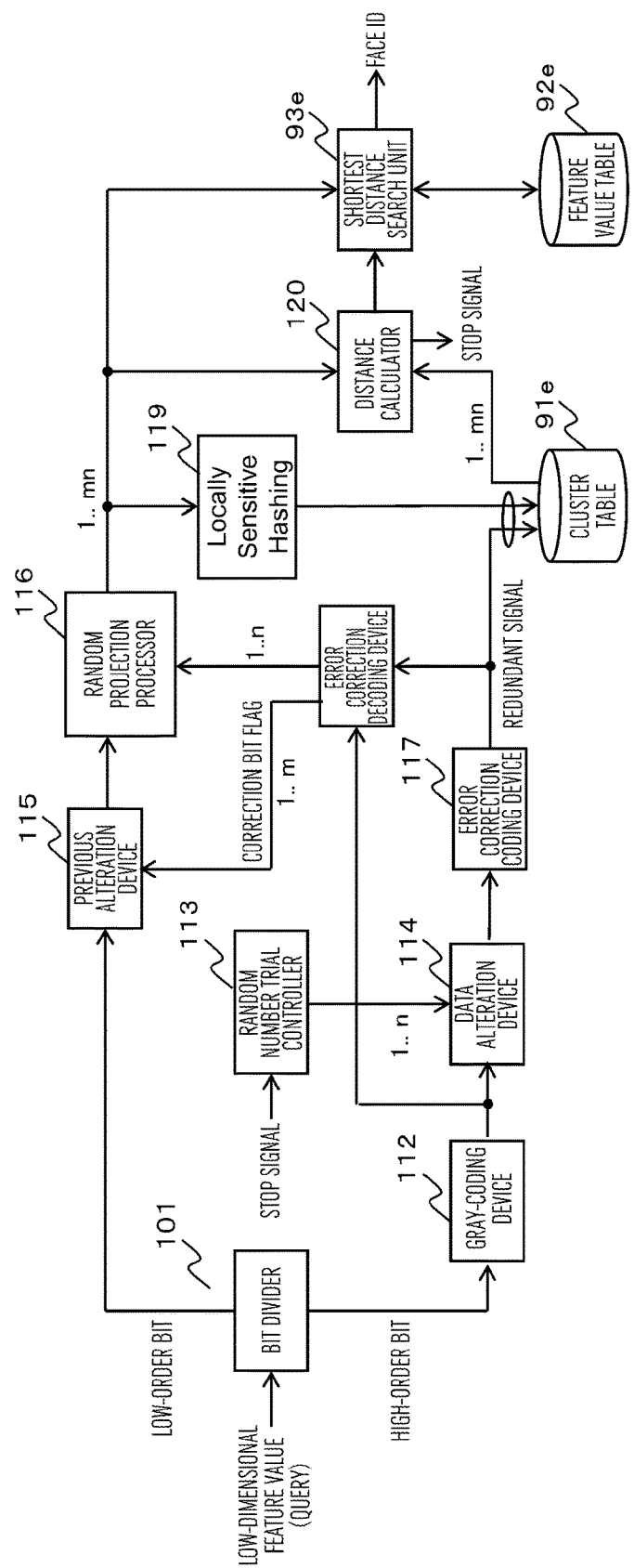
FIG. 11 illustrates an exemplary configuration of function means for DB searching at S87.

FIGS. 9 and 11 illustrate variations of DB search at S87.

A DB search means 87a of FIG. 9(a) is configured to search for a feature value which is protected by the template protection unit 44a and is clustered by the clustering unit 65a. The protected feature value is configured of a hash value and the residual, and is extracted by the separator 71. Further, clustering is performed 1 to 1 with respect to the hash value basically.

A cluster table 91a has the same content as that of the cluster table 67a in the DB 66. When a hash value is given as a cluster ID, a feature value table 92a of the corresponding cluster is accessible.

The feature value table 92a is the same as that in the DB 66, in which the residual in the protected feature value is held.

A minimum distance search unit 93 finds one having the smallest distance (Manhattan distance) with the residual of the feature value given at S86 in the feature value table 92a of the corresponding cluster, and outputs the face ID of the feature value. When the size of the cluster is small, linear searching may be used.

A DB search means 87b of the example illustrated in FIG. 9(b) is configured to search for a feature value which is protected by the template protection unit 44b and clustered by the clustering unit 65b. Regarding the feature value, distance preservation is made in the entire feature value space, and an arbitrary clustering method can be used regardless of template protection.

A cluster table 91b has the same content as that of the cluster table 67a. When a hash value is given as a cluster ID, the feature value table 92a of the corresponding cluster is accessible.

A cluster table 92b is the same as that of the cluster table 67b, and holds a dictionary which links a hash value and a cluster ID, and hash function information used for clustering.

An LSH unit 94 reads the hash function information in the cluster table 91b, and outputs a hash value of the query feature value. Generally, one cluster ID is obtained by referring to the dictionary with this hash value.

Then, similar to the case of the DB search means 87a, the shortest distance search unit 93 performs searching in the cluster.

The DB search means 87b can also be used for searching for a feature value protected by the template protection unit 44c. Such a feature value is deemed that the distance is preserved macroscopically (sufficiently larger than the cluster).

As a DB search means 87c for searching for a feature value protected by the template protection unit 44c and clustered by the clustering unit 65c is similar to the DB search means 87a or 87b, the description is not provided herein.

A DB search means 87d for searching for a feature value protected by the template protection unit 44d and clustered by the clustering unit 65d is configured such that an encryption decoding unit 94 (having the same configuration as that of the encryption decoding unit 78) is simply added to the DB search means 87d. As such, the description thereof is not provided herein.

A DB search means 87e of an example shown in FIG. 11 is configured to search for a feature value protected by the template protection unit 44e and clustered by the clustering unit 65d. The feature value handled here includes the main body of the protected feature value and a redundant symbol. The clustering unit 65d combines the redundant symbol LSH and a hash value to associate them with a cluster ID. As DB search means 87e also performs iterative processing, the means for template protection of S86 is illustrated together.

A configuration from a bit divider 111, a Gray coding device 112, a data alteration device 114, to the error correction coding unit 117 constitute a template protection means for generating a query and have the same configurations as those of the bit divider 101, the Gray-coding device 102, the data alteration device 104 and the error correction coding unit 107 shown in FIG. 10, respectively.

However, the gray coding device 112 is able to output Gray code, before applied with data alteration, to the DB search means 87d. Further, a previous alteration device 115 performs alteration according to a correction bit flag given by the DB search means 87e, rather than a random number. Further, an RP processor 116 performs RP according to the corrected Gray code given by the DB search means 87e.

A random number trial controller 113 is configured to control trial operation for the entire sets of random numbers. The random number trial controller 113 sequentially provides the data alteration device 114 with n pieces of numbers corresponding to the length (the number of bits) of the Gray code. Accordingly, from the template protection means, n sets of protected feature values (including redundant symbol) are output at maximum. The n times of trial are performed for searching for a redundant symbol which would be obtained at the time of registration if there is a registration similar to the query in the DB 80, which can be searched without distinguishing whether it is caused because the hash value is slightly different or due to a random number.

An error correction decoding device 119 applies error correction decoding to the non-altered Gray code from the gray coding device 112 by using a redundant symbol from the error correction coding device 117, and when correction can be made normally, outputs the corrected Gray code and a correction bit flag indicating the position of the corrected bit. When there are a plurality of correction bits, a correction bit flag is output for each bit, and trial is performed. This means that it is considered that one of the correction bits is altered by a random number and the residual is due to a slight difference of a hash value caused between the time of registration and the time of searching.

As a result, previous alteration is made based on the correction bit flag, and a protected feature value, which is applied with RP based on the corrected Gray code, is obtained.

An LSH unit 119 calculates a hash value of the protected feature value by a hash function which is the same as that used by the cluster dividing unit 72.

A cluster table 91$e$ is the same as the cluster table 91$b$. For each cluster, when an access is made by using a set (cluster ID) of the redundant symbol input to the error correction decoding device 119 and the hash value from the LSH unit 119 as an argument, an address for accessing the feature value table of the cluster and a cluster attribute are returned. In this example, as a cluster attribute, it is assumed that arbitrary one or more feature values (representative feature value) classified to the cluster is usable. Even when a cluster attribute is unusable, it is only necessary to take out one feature value appropriately by accessing the feature value table 92$e$ each time.

It should be noted that as the cluster table 91$e$ is of a dictionary type, when it is not in the dictionary (cluster does not exist), the trial moves to the next one.

A distance calculator 120 is one similar to the distance calculator 75. The distance calculator 120 calculates a distance between the feature value of the cluster returned from the cluster table 91$e$ and the protected feature value of the query, and during n times of trials, each time a distance of a predetermined threshold or less is obtained, outputs a trial break signal to the random number trial controller 113, and provides the shortest distance search unit 121 with the address of a feature value table 92$e$ of the cluster. The threshold is determined based on the roughness of the LSH. To realize the distance being the threshold or less, it is not enough that a redundant symbol matches accidentally. A query similar to the feature value registered along with the redundant symbol must be prepared.

It should be noted that when there are a plurality of registers of the same person in the DB 80, the distance may take the threshold or less a number of times.

The shortest distance search unit 93$e$ performs similarity search to the protected feature value of the query in the feature value table 92$e$ of the provided address at a level that a person can be identified. Then, it outputs a face ID of the most similar feature value or a feature value in which the distance takes the predetermined threshold or less first.

Finally, the DB search means 87$e$ returns one face ID or information representing not applicable, as a search result.

Again returning to FIG. 8, at S88, when a similar person has been found by the searching at S87, the result (face ID, source image of the feature value, etc.) is transmitted.

It should be noted that at S89 in which operation has been started first, reception of the search result is always waited. A received search result of one time can be held, and when the search result is held or a new one is received, the processing proceeds to S90.

At S90, a synthetic sound for stopping a person who is going to pass by the camera is played, and a screen asking the person to perform identity verification is displayed. At that time, by using the face ID as an argument, a personal table in the DB 80 is acquired as personal information, and the content of identity verification screen is selected depending on whether the telephone number included in the personal information is a telephone number of the person of the face (verification target person) or that of the registrant (verification requesting person).

FIG. 12 illustrates an example of an identity verification screen.

FIG. 12($a$) is an identity verification screen 121 presenting a telephone number of the person. The screen 121 includes an agree button (searched-for person button) 122 to be pressed by a person in front of the screen when the person recognizes that the presented telephone number is his/her own one, a disagree button (different person button) 123 to be pressed when the person recognizes that the telephone number is not his/her own one, and a withholding button 124 to be pressed when the person wishes to withhold the determination.

FIG. 12($b$) is an identity verification screen 126 presenting a telephone number of a registrant, including three buttons similarly.

When the identity verification screen is displayed, operation is performed at S91 and S92 in parallel.

At S91, operation of a human I/F by a person is waited.

At S92, a timer is started. The timer is fired when the timeout time (30 seconds, for example) for pressing a button comes, whereby the processing can be proceeded to the next processing even if no button is pressed.

At S93, it is determined which button is pressed. When the withholding button 124 is pressed, nothing special is performed.

When the agree button 122 is pressed, as S94, an email or a short message indicating that the person (verified person) is found to the email address or the telephone number of the verification requesting person shown in the personal information acquired at S88. It is also possible to request the portal server 2, a telecommunication carrier, or the like to perform such transmission. An email or the like includes information showing the place where the image of the verified person is captured. As there is a possibility that the terminal of the verification requesting person is set to reject reception of an email or a short message, when transmission failed, it is desirable to transmit it again using another method or from another server.

At S89, when it is determined that the agree button 122 is pressed, as S95, the face ID record is deleted from the feature value table or the personal table in the DB 80 such that the person will not be searched again even if he/she passes by the camera again.

As described above, in the detection application program of the field server 2, as the DB 66 can be used only by an authorized manager, it is difficult to use it for an object other than the original object. Even if it is used by a malicious user, as the search frequency is limited, no performance can be achieved although the user tries to obtain a search result by preparing video images in which face images are switched by the frames, for example. Further, in the case where a similar person is found, although the personal information might be disclosed, it is limited to a telephone number. Telephone number is less likely to be used for cracking act on line, and in the case of a telephone number of the registrant who is not the searched-for person, it may be worthless as personal information. It is also acceptable to use a secret password or the like which can only be understood between the searched-for person and the registrant, rather than a telephone number.

As described above, with the personal safety verification system 1 of the embodiment 1, it is possible to search for a verification target person without any active work by the verification target person in times of disaster or the like.

The personal safety verification system 1 of the present embodiment can be carried out in various variations. In the present embodiment, while a DB downloaded to the field server 2 is the same as the DB 66 of the portal server in consideration of instability of the communication environment, it is possible to use only a cluster table or only a cluster table and a feature value table, and acquire necessary information from the portal server each time according to success or failure of similarity search.

Further, in the case where there is no request for continuation of registration within a predetermined time from the verification requesting person who received a notification at S94, or when predetermined days elapsed from the registration, such a registration may be deleted from the DB 66.

The personal safety verification system 1 of the present embodiment is applicable to various uses. While the present embodiment is based on the premise that a searched-for person is alive, it may also be used by the police, diplomatic establishments abroad, or the like, for estimating the identification from the face picture of a dead body. The point of contact (raw data) of the registrant of the face which is recognized to be similar is provided to the police, and is used for asking the relatives, a dentist, or the like to perform identity verification.

It is desirable that registration is performed after presenting, to the registrant, that to whom the registered content is disclosed and how it is used, so that the registrant can recognize them.

Alternatively, it is also possible to register the face of a dead body and use a safety verification request as a query.

Here, the configurations such as systems and devices of the present invention are not limited to those described above, and various configurations may be used. Further, the present invention may be provided as a method or a device for executing processing according to the present invention, a program for causing a computer to realize such a method, and a non-transitory tangible medium storing the program, for example.

INDUSTRIAL APPLICABILITY

The present invention is widely applicable to a device for performing similarity search on data encrypted for confidentiality, and is suitable for a biometrics authentication system, CCTV (Closed-Circuit Television) system, and the like.

REFERENCE SIGNS LIST

2 video image accumulation server
3 similar face image search server
4 display terminal
5 management terminal
6 LAN
11 facility
12, 12*a*, 12*b*, 12*c*, 12*d* surveillance camera
13 database (DB)
14 white list
15 suspicious person appearance list
16 selection and thinning unit
17 grouping unit
18 suspicious person candidate search unit
19 suspicious person determination unit
21 camera I/F
22 recording and distribution control unit
23 Web server unit
24 storage
25 setting holding unit 25
41 image acquisition I/F
42 face detection and feature value calculation unit
43 face registration and search unit
44 face feature value DB
45 Web service unit
46 search trigger unit
47 setting holding unit
48 failure notification unit
71 person ID table
72 final search date/time list
73 black list

The invention claimed is:

1. A similarity search method performed on data encrypted for confidentiality, the method comprising:
    a first step of encrypting a plurality of units of sampled data for confidentiality by mapping in which a distance is preserved at least locally in a sampled data space;
    a second step of clustering and recording a pair of the sampled data encrypted for confidentiality and arbitrary data, based on the sampled data encrypted for confidentiality itself;
    a third step of encrypting query data for confidentiality by a method same as the method used for the sampled data;
    a fourth step of identifying a cluster in which sampled data similar to the query data is recorded, based on the query data encrypted for confidentiality; and
    a fifth step of identifying, from the identified cluster, a unit of sampled data similar to the query data, by calculating a distance between the sampled data encrypted for confidentiality and the query data encrypted for confidentiality, and accessing arbitrary data paired with the unit of the sampled data, wherein
    the encrypting the data for confidentiality in the first step and the third step includes:
    a sub step of quantizing the data on a data space thereof;
    a sub step of subtracting the quantized data from the data to obtain a residual; and
    a sub step of inputting the quantized data to a cryptographic hash function to obtain a hash value,
    wherein a set of the hash value and the residual is output as data encrypted for confidentiality, and
    the clustering in the second step includes, based on part of the hash value of the sampled data encrypted for confidentiality, associating the hash value and a cluster one to one or many to one.

2. The similarity search method performed on the data encrypted for confidentiality, according to claim 1, wherein the encrypting the data for confidentiality in the first step and the third step includes:
    a sub step of generating a random projection (RP) matrix having a number of columns corresponding to a number of elements of the data, based on a given specific number; and
    a sub step of supposing the data to be a column vector and multiplying the RP matrix from a top to obtain data encrypted for confidentiality, and the data is mapped to a space of the data encrypted for confidentiality in which a distance is preserved substantially in an entire vector space.

3. The similarity search method performed on the data encrypted for confidentiality, according to claim 2, wherein the RP matrix is a unitary matrix.

4. The similarity search method performed on the data encrypted for confidentiality, according to claim 1, wherein the encrypting the data for confidentiality in the first step and the third step includes:
a first sub step of supposing the data to be a column vector, and encoding the data such that a hamming length becomes shorter as a distance is shorter locally in a vector space thereof;
a second sub step of, based on the encoded data, generating a random projection (RP) matrix randomized under a predetermined rule; and
a third sub step of multiplying the data supposed to be a column vector by the RP matrix from a top to obtain data encrypted for confidentiality, and
the clustering in the second step is performed such that units of sampled data encrypted for confidentiality, having a short distance with each other in a space of the sampled data encrypted for confidentiality, are in a same cluster.

5. The similarity search method performed on the data encrypted for confidentiality, according to claim 4, wherein the encoding in the first sub step uses one of locality sensitive hashing, vector quantization, error correction code, distance preserving run length limited code, permutation code, distance preserving map code, rank modulation code, and Gray code, or a combination thereof.

6. The similarity search method performed on the data encrypted for confidentiality, according to claim 1, wherein the encrypting the sampled data for confidentiality in the first step includes:
a first sub step of dividing the sampled data into two by a method of separating a high-order bit and a low-order bit in binary representation of each element;
a second sub step of Gray-coding data of the high-order bit obtained through the division into two for each element;
a third sub step of generating a random number;
a fourth sub step of altering a part of the Gray code under a predetermined rule based on the random number;
a fifth sub step of altering data of the low-order bit obtained through the division into two, based on the random number;
a sixth sub step of supposing the altered data of the low-order bit to be a column vector, and multiplying a random projection (RP) matrix, generated based on the altered Gray code, from a top, to obtain data of the low-order bit to which random projection is applied;
a seventh sub step of applying error correction coding to the altered Gray code to obtain a redundant symbol; and
an eighth sub step of linking the data of the low-order bit, to which the random projection is applied, and the redundant symbol to obtain data encrypted for confidentiality.

7. The similarity search method performed on the data encrypted for confidentiality, according to claim 1, wherein in the encrypting the query data for confidentiality in the third step includes:
a first sub step of dividing the query data into two by a method of separating a high-order bit and a low-order bit in binary representation of each element;
a second sub step of Gray-coding data of the high-order bit obtained through the division into two for each element;
a third sub step of determining, from among numbers of entire sets having a possibility to be generated as random numbers, one on which a trial is to be performed;
a fourth sub step of altering a part of the Gray code under a predetermined rule, based on the one number on which the trial is to be performed;
a fifth sub step of applying error correction coding to the altered Gray code to obtain a redundant symbol;
a sixth sub step of applying error correction decoding to the Gray code before alteration by using the redundant symbol;
a seventh sub step of altering data of the low-order bit obtained by the division into two, based on a position of a bit corrected by the error correction decoding;
an eighth sub step of supposing data of the altered low-order bit to be a column vector, multiplying a random projection (RP) matrix, generated based on the altered Gray code, from a top to obtain data of the lower-order bit to which random projection is applied, and
a ninth sub step of linking the data of the low-order bit, to which the random projection is applied, and the redundant symbol to obtain data encrypted for confidentiality.

8. The similarity search method performed on the data encrypted for confidentiality, according to claim 7, wherein the error correction coding in the fifth sub step has an error correction capability of not less than a number obtained by adding 1 to a double number of the number of bits having a possibility that the Gray code is altered, and
the identifying the cluster in the fourth step includes narrowing down clusters having a possibility that sampled data similar to the query data is recorded, to a number less than a number of times of trials in the third sub step.

9. The similarity search method performed on the data encrypted for confidentiality, according to claim 1, wherein the units of sampled data are an image feature value vector in which dimensionality is reduced by main component analysis, independent component analysis, or linear discriminant analysis, or biometrics information.

* * * * *